US011806288B2

(12) United States Patent
Lonner et al.

(10) Patent No.: US 11,806,288 B2
(45) Date of Patent: Nov. 7, 2023

(54) AUTONOMOUS ROBOTIC MOBILE SUPPORT SYSTEM FOR THE MOBILITY-IMPAIRED

(71) Applicant: Ambulatus Robotics LLC, Wynnewood, PA (US)

(72) Inventors: Jess H. Lonner, Wynnewood, PA (US); Hashem Ashrafiuon, Philadelphia, PA (US)

(73) Assignee: Ambulatus Robotics LLC, Wynnewood, PA (US)

( * ) Notice: Subject to any disclaimer, the term of this patent is extended or adjusted under 35 U.S.C. 154(b) by 707 days.

(21) Appl. No.: 16/996,554

(22) Filed: Aug. 18, 2020

(65) Prior Publication Data
US 2021/0121343 A1    Apr. 29, 2021

Related U.S. Application Data

(60) Provisional application No. 62/926,709, filed on Oct. 28, 2019.

(51) Int. Cl.
*A61G 5/04* (2013.01)
*G05D 1/02* (2020.01)
(Continued)

(52) U.S. Cl.
CPC .............. *A61G 5/041* (2013.01); *B25J 5/007* (2013.01); *B25J 11/009* (2013.01); *B25J 13/086* (2013.01);
(Continued)

(58) Field of Classification Search
CPC ......... A61G 5/041; B25J 5/007; B25J 11/009; B25J 13/086; B25J 15/0019; B25J 19/022
See application file for complete search history.

(56) References Cited

U.S. PATENT DOCUMENTS

| 7,544,172 B2 * | 6/2009 | Santos-Munne ..... A61H 1/0292 601/5 |
| 10,219,969 B2 | 3/2019 | Yu |

(Continued)

FOREIGN PATENT DOCUMENTS

| CN | 101803988 | 6/2011 |
| CN | 107693314 | 2/2018 |

(Continued)

OTHER PUBLICATIONS

Bar-Cohen Y, Mavrodis C, Meili-Huber J, Fisch A. Lightweight exoskeletons with controllable actuators, Tech Briefs, Mechanical & Fluid Systems, Engineering Solutions for Design & Manufacturing, 2004.

(Continued)

*Primary Examiner* — Erez Gurari
(74) *Attorney, Agent, or Firm* — Levine Bagade Han LLP

(57) ABSTRACT

Disclosed is a robotic mobile support system configured to autonomously follow a subject with impaired mobility from a close but safe distance behind the subject and react to movements of the subject's torso and upper body to provide dynamic support for the subject and stop the subject from falling. The system comprises a mobile base vehicle, a robotic arm installed on the mobile base vehicle, and a LIDAR sensor for detecting the distance to a subject and the direction/speed of the subject. The robotic arm comprises one or more adjustable rear and side soft supports configured to support the subject and stop the subject from falling. The system can also comprise an onboard computer configured to process LIDAR data to control the movement of the mobile base vehicle and the robotic arm to stop the subject from falling.

29 Claims, 8 Drawing Sheets

(51) Int. Cl.

| | |
|---|---|
| *B25J 11/00* | (2006.01) |
| *B25J 13/08* | (2006.01) |
| *B25J 5/00* | (2006.01) |
| *G01S 17/08* | (2006.01) |
| *G01S 17/58* | (2006.01) |
| *G01S 17/88* | (2006.01) |
| *B25J 15/00* | (2006.01) |

(52) U.S. Cl.
CPC ............ *B25J 15/0019* (2013.01); *G01S 17/08* (2013.01); *G01S 17/58* (2013.01); *G01S 17/88* (2013.01); *G05D 1/028* (2013.01); *G05D 1/0238* (2013.01); *G05D 2201/0206* (2013.01)

(56) References Cited

U.S. PATENT DOCUMENTS

| | | | |
|---|---|---|---|
| 10,521,805 | B2 | 4/2019 | Morbi et al. |
| 10,493,617 | B1* | 12/2019 | Holson ................ B25J 13/088 |
| 10,677,980 | B2 | 6/2020 | Shen et al. |
| 11,407,118 | B1* | 8/2022 | Augenbraun .......... B25J 9/1612 |
| 2009/0275867 | A1 | 11/2009 | Santos-Munne et al. |
| 2010/0206651 | A1* | 8/2010 | Nagasaka ................ B25J 5/007 180/218 |
| 2013/0331991 | A1* | 12/2013 | Horinouchi ............. B25J 5/007 414/744.5 |
| 2015/0005938 | A1* | 1/2015 | Suzuki ................ A61G 7/1046 700/253 |
| 2015/0359691 | A1* | 12/2015 | Isozumi ................... A61H 3/04 180/19.1 |
| 2017/0035631 | A1* | 2/2017 | Tsusaka ................ B25J 11/009 |
| 2017/0216120 | A1* | 8/2017 | Tsu ...................... A61G 7/1017 |
| 2018/0001946 | A1 | 1/2018 | Yokoya et al. |
| 2018/0215040 | A1* | 8/2018 | Asahara ................. B25J 9/1694 |
| 2018/0289579 | A1 | 11/2018 | Agrawal |
| 2020/0016745 | A1* | 1/2020 | Tang ................... B25J 11/0005 |
| 2020/0139559 | A1* | 5/2020 | Grow ................... B25J 15/0019 |
| 2021/0031385 | A1* | 2/2021 | Rembisz ................. G01S 17/89 |
| 2021/0121343 | A1* | 4/2021 | Conner .................. B25J 13/086 |
| 2021/0162961 | A1* | 6/2021 | Yamaguchi ............. B25J 5/007 |
| 2021/0206004 | A1* | 7/2021 | Doi ........................ B25J 19/06 |
| 2021/0237554 | A1* | 8/2021 | Bangalore Srinivas ..................... B60K 17/043 |
| 2021/0330528 | A1* | 10/2021 | Isozumi ............... A61B 5/4803 |
| 2021/0387349 | A1* | 12/2021 | Oz ......................... B25J 9/0087 |
| 2021/0393342 | A1* | 12/2021 | Beckman ............. B25J 15/0052 |
| 2022/0019214 | A1* | 1/2022 | Solanki .................. B65G 43/08 |
| 2022/0026538 | A1* | 1/2022 | Kamakura .......... G01B 11/2527 |
| 2022/0088795 | A1* | 3/2022 | Aoki ....................... B25J 9/1697 |
| 2022/0143441 | A1* | 5/2022 | Hu ......................... A62C 31/02 |
| 2022/0203542 | A1* | 6/2022 | Garabini ............... B65G 47/907 |
| 2022/0395974 | A1* | 12/2022 | Balasubramanian .. B65G 61/00 |
| 2023/0072318 | A1* | 3/2023 | Ding ......................... A61H 3/04 |
| 2023/0111676 | A1* | 4/2023 | Markarian ............... B25J 9/162 700/258 |
| 2023/0138728 | A1* | 5/2023 | Alspach .................. G01L 1/127 73/862.581 |
| 2023/0150112 | A1* | 5/2023 | Morioka ................ B25J 13/085 180/6.48 |

FOREIGN PATENT DOCUMENTS

| | | |
|---|---|---|
| JP | 2004089615 | 3/2004 |
| WO | WO 2020/159442 | 8/2020 |
| WO | WO 2021/086471 | 5/2021 |

OTHER PUBLICATIONS

Berggren M, Englund U, Olofsson B, Nordström P, Gustafson Y, Stenvall M. Effects of Geriatric Interdisciplinary Home Rehabilitation on Complications and Readmissions After Hip Fracture: A Randomized Controlled Trial. Clinical Rehabilitation, 33(1): 64-73, 2019.

Colombo G, Jörg M, Dietz V. Driven Gait Orthosis to Do Locomotor Training of Paraplegic Patients. Proceedings of the 22nd Annual EMBS International Conference, 3159-3163, Chicago, IL, Jul. 23-28, 2000.

Cozart HC, Cesario SK: Falls Aren't Us: State of the Science. Crit Care Nurs Q 2009;32(2):116-127.

Currie L: Fall and Injury Prevention, Patient Safety and Quality: An Evidence-Based Handbook for Nurses edited by Hughes RG. Rockville, Agency for Healthcare Research and Quality, 2008, pp. 195-250.

Ellerbe, R. "A Model to Project the Supply and Demand of Physical Therapists 2010-2025" Apr. 17, 2017, www.apta.org/WorkforceData/ModelDescriptionFigures/.

Falls Cost U.S. Hospitals $34 Billion in Direct Medical Costs, Under the Dome Apr. 2015, Issue 4 at https://www.johnshopkins-solutions.com/newsletters/falls-cost-u-s-hospitals-30-billion-in-direct-medical-costs/.

Ferris D, Sawicki G, Domingo A. Powered Lower Limb Orthoses for Gait Rehabilitation. Topics in Spinal Cord Injury Rehabilitation, 11(2):34-49, 2005.

Florence, CS, Bergen G, Atherly A, Burns E, Stevens J, Drake C. The Medical Costs of Fatal Falls and Fall Injuries among Older Adults. J Am Geriatr Soc. Apr. 2018, 66(4): 693-698. doi:10.1111/jgs.15304; National Center for Health Statistics. Health, United States, 2005.

Foss NB, Palm H, Kehlet H. In-hospital hip fractures: Prevalence, risk factors, and outcome. Age and Aging. 34:642-645, 2005.

Glover, Jared et al., A Robotically-Augmented Walker for Older Adults, Carnegie Mellon University, Aug. 1, 2003 at https://kilthub.cmu.edu/articles/A_robotically-augmented_walker_for_older_adults/6591308/1.

Hitcho EB, Krauss MJ, Birge S, et al. Characteristics and Circumstances of Falls in a Hospital Setting: A Prospective Analysis. J Gen Intern Med. Jul. 2004;19(7):732-9.

Ihn-Sik Weon; Soon-Geul Lee. Intelligent Robotic Walker with Actively Controlled Human Interaction. First published: Aug. 7, 2018 at https://doi.org/10.4218/etrij .2017-0329.

Linattiniemi S, Jokelainen J, Luukinen H: Falls Risk Among a Very Old Home-Dwelling Population. Scand J Prim Health Care 2009;27(1):25-30.

Inouye SK, Brown CJ, Tinetti ME: Medicare Nonpayment, Hospital Falls, and Unintended Consequences. N Engl. J. Med 2009; 360(23):2390-2393.

Johnson RL, Duncan CM, Ahn KS, Schroeder DR, Horlocker TT, Kopp SL. Fall-Prevention Strategies and Patient Characteristics That Impact Fall Rates After Total Knee Arthroplasty. Anesthesia & Analgesia, 119:1113-1118, 2014.

Jørgensen CC, Kehlet H. Fall-Related Admissions After Fast-Track Total Hip and Knee Arthroplasty—Cause of Concern or Consequence of Success? Clinical Interventions in Aging, 8:1569-1577, 2013.

Kawamoto H, Sankai Y. Power Assist System HAL-3 for Gait Disorder Person. Computers Helping People with Special Needs 8th International Conference; Proceedings Lecture Notes in Computer Science, vol. 2398, 196-203, 2002.

Kawamoto H. Comfortable Power Assist Control Method for Walking Aid by HAL-3. IEEE International Conference on Systems, Man and Cybernetics, 4:447-452, 2002.

Luz C, Bush T, Shen X. Do Canes or Walkers Make Any Difference? Non-use and Fall Injuries. The Gerontologist, 57:211-218, 2017.

Mandi LA, Lyman S, Quinlan P, Bailey T, Katz J, Magid SK. Falls Among Patients Who Had Elective Orthopaedic Surgery: A Decade of Experience from a Musculoskeletal Specialty Hospital. J Orthop Sports Phys Ther 43:91-96, 2013.

Memtsoudis SG, Dy CJ, Ma Y, Chiu YL, Della Valle AG, Mazumdar M. In-Hospital Patient Falls After Total Joint Arthroplasty: Incidence, Demographics, and Risk Factors in the United States. J Arthroplasty, 27:823-828, 2012.

Pelt CE, Anderson AW, Anderson MB, Dine CV, Peters CL. Postoperative Falls After Total Knee Arthroplasty in Patients with a Femoral Nerve Catheter: Can We Reduce the Incidence? The Journal of Arthroplasty, 29:1154-1157, 2014.

(56) References Cited

OTHER PUBLICATIONS

Piau, A. et al., "Use of a robotic walking aid in rehabilitation to reduce fear of falling is feasible and acceptable from the end user's perspective: A randomised comparative study," Maturitas 120, 40-46, 2019.

Pollack, Martha E., Pearl: A mobile Robotic Assistant for the Elderly, 2002, at https://www.cs.cmu.edu/~flo/papers/umich/aaai02wkshp.pdf.

Pratt J, Krupp B, Morse J, Collins S. The Roboknee: An Exoskeleton for Enhancing Strength and Endurance During Walking. Proceedings of IEEE International Conference on Robotics and Automation, 2430-2435, 2004.

Rubenstein LZ. Preventing Falls in the Nursing Home. Journal of the American Medical Association, 278(7):595-6, 1997.

Sahyoun NR, Pratt LA, Lentzner H, Dey A, Robinson KN. The Changing Profile of Nursing Home Residents: 1985-1997. Aging Trends; No. 4. Hyattsville (MD): National Center for Health Statistics; 2001.

Stevens JA, Thomas K, Teh L, Greenspan AI. Unintentional Fall Injuries Associated with Walkers and Canes in Older Adults Treated in U.S. Emergency Departments. J Am Geriatr Soc. 57(8):1464-9, 2009.

Stramel DM, Carrera RM, Rahok SA, Stein J, Agrawal SK. Effects of a Person-Following Light-Touch Device During Overground Walking with Visual Perturbations in a Virtual Reality Environment. IEEE Robotics and Automation Letters, 4(4):4139-4146, 2019.

Taylor et al. The Falls Management Program: A Quality Improvement Initiative for Nursing Facilities, Agency for Healthcare Research and Quality, 2012 at https://www.ahrq.gov/patient-safety/settings/long-term-care/resource/injuries/fallspx/man1.html.

Thomas S, Halbert J, MacKintosh S, Cameron ID, Kurrie S, Whitehead C, Miller M, Crotty M. Walking Aid Use after Discharge Following Hip Fracture is Rarely Reviewed and Often Inappropriate: An observational Study. Journal of Physiotherapy, 56:267-272, 2010.

Vassallo M, Sharma JC, Briggs RS and Allen SC. Characteristics of early fallers on elderly patient rehabilitation wards. Age and Ageing, 32:338-342, 2003.

Vieira ER, Freund-Heritage R, da Costa BR. Risk Factors for Geriatric Patient Falls in Rehabilitation Hospital Settings: A Systematic Review. Clinical Rehabilitation, 25: 788-799, 2011.

Vlahov D, Myers AH, al-lbrahim MS. Epidemiology of Falls Among Patients in a Rehabilitation Hospital. Arch Phys Med Rehabil, 71(1):8-12, 1990.

Wasserstein D, Farlinger C, Brull R, Mahomed N, Gandhi R. Advanced Age, Obesity and Continuous Femoral Nerve Blockade Are Independent Risk Factors for Inpatient Falls After Primary Total Knee Arthroplasty. J Arthroplasty, 28:1121-1124, 2013.

Werner C, Moustris GP, Tzafestas CS, Hauer K. User-Oriented Evaluation of a Robotic Rollator That Provides Navigation Assistance in Frail Older Adults with and without Cognitive Impairment. Gerontology 2018, 64:278-290.

Yamamoto K, Ishii M, Noborisaka H, Hyodo K. Stand Alone Wearable Power Assisting Suit—Sensing and Control Systems. Proceedings of IEEE International Workshop on Robot and Human Interactive Communication, 661-666, 2004.

\* cited by examiner

AUTONOMOUS ROBOTIC MOBILE SUPPORT SYSTEM FOR THE MOBILITY-IMPAIRED

CROSS-REFERENCE TO RELATED APPLICATION

This application claims the benefit of U.S. Provisional Application No. 62/926,709 filed on Oct. 28, 2019, the entirety of which is incorporated herein by reference.

TECHNICAL FIELD

The present disclosure relates generally to the field of equipment used to provide support for mobility impaired or geriatric users, and, more specifically, to an autonomous robotic mobile support system used to stop falls in and provide support to mobility-impaired or geriatric users.

BACKGROUND

Falls among the geriatric population in the United States and around the world are a major problem, occurring in more than 1 in 4 (28.7%) Americans aged 65 and older every year. According to the Centers for Disease Control and Prevention, falls are the leading cause of fatal injury and the most common cause of nonfatal trauma-related hospital admissions in older adults. Falls result in over 3 million injuries treated in Emergency Departments annually, including over 960,000 hospitalizations and nearly 27,000 deaths. Nationally, the rate of deaths from falls in the geriatric population increased 31% between 2007 and 2016, with the greatest increase in those aged 85 and older. It is projected that by 2030, there will be an estimated 48.8 million falls resulting in 11.9 million fall injuries and 59,000 deaths in U.S. residents aged 65 years and older. The total cost of fall injuries in 2020 is estimated to exceed $67 billion; those numbers may double within 10 years. See Florence C S, Bergen G, Atherly A, Burns E, Stevens J, Drake C. The Medical Costs of Fatal Falls and Fall Injuries among Older Adults. *J Am Geriatr Soc.* 2018 April, 66(4): 693-698. doi:10.1111/jgs.15304; National Center for Health Statistics. Health, United States, 2005. *Chartbook on Trends in the Health of Americans.* US Dept of Health Service, Hyattsville, Md., 2005; CDC Morbidity and Mortality Weekly Report at https://www.cdc.gov/injury/wisqars; and CDC Web-Based Injury Statistics Query and Reporting System at https://www.cdc.gov/mmwr/volumes/65/wr/mm6537a2.htm.

U.S. hospitals, nursing homes and extended care facilities are not immune to patient falls. Despite programmatic efforts and various evidence-based guidelines to mitigate fall risk—including improved supervision, physical therapy and use of walkers, among other strategies—fall rates have persisted at an alarming rate. See Foss N B, Palm H, Kehlet H. In-hospital hip fractures: Prevalence, risk factors, and outcome. *Age and Aging.* 34:642-645, 2005.

In fact, falls are the most frequently reported adverse event in the adult inpatient setting. As the population of nursing home and extended care facility residents grows and the numbers of patients hospitalized after total knee and hip replacements and hip fracture surgery increases, the incidence of falls remains a daunting concern. In the hospital setting, approximately 3% to 20% of inpatients fall at least once during their stay, which translates to 4 to 12 falls per 1,000 bed days. See Cozart H C, Cesario S K: Falls Aren't Us: State of the Science. *Crit Care Nurs Q* 2009; 32(2):116-127 and Inouye S K, Brown C J, Tinetti M E: Medicare Nonpayment, Hospital Falls, and Unintended Consequences. *N Engl. J. Med* 2009; 360(23):2390-2393.

It is currently estimated that there are 700,000 in-hospital falls/year, and that number is expected to soon reach more than 1 million/year. Compared to non-hospitalized persons of comparable ages, the risk of falling and sustaining a hip fracture is 11 times greater in hospitalized patients. Injuries are reported to occur in approximately 6% to 44% of acute inpatient falls. Serious injuries from in-facility falls, such as head injuries or fractures, occur in 2% to 8%, resulting in approximately 90,000 serious injuries each year. See Currie L: Fall and Injury Prevention, *Patient Safety and Quality: An Evidence-Based Handbook for Nurses* edited by Hughes R G. Rockville, Agency for Healthcare Research and Quality, 2008, pp 195-250 and Hitcho E B, Krauss M J, Birge S, et al. Characteristics and Circumstances of Falls in a Hospital Setting: A Prospective Analysis. *J Gen Intern Med.* July 2004; 19(7):732-9.

In the inpatient hospital setting, there are approximately 11,000 fatal falls per year nationwide. The direct costs of falling while hospitalized can be considerable, adding an average cost of $34,294 per in-hospital fall episode (in 2012 dollars). See Falls Cost U.S. Hospitals $34 Billion in Direct Medical Costs, *Under the Dome* April 2015, Issue 4 at https://www.johnshopkinssolutions.com/newsletters/falls-cost-u-s-hospitals-30-billion-in-direct-medical-costs/.

Extrapolating these expenses to the total numbers of serious inpatient falls that result in injuries, the annual healthcare costs due to inpatient hospital falls are over $4 billion (in today's dollars), not to mention the hundreds of millions of dollars in legal costs and the enormous emotional costs.

Circumstances are even more concerning in nursing homes, where 1.6 million people reside. See Sahyoun N R, Pratt L A, Lentzner H, Dey A, Robinson K N. The Changing Profile of Nursing Home Residents: 1985-1997. *Aging Trends*; No. 4. Hyattsville (Md.): National Center for Health Statistics; 2001 and The Falls Management Program: A Quality Improvement Initiative for Nursing Facilities, Agency for Healthcare Research and Quality, 2012 at https://www.ahrq.gov/patient-safety/settings/long-term-care/resource/injuries/fallspx/manl.html.

If current rates continue, by 2030 this number will rise to about 3 million. Between 50% and 75% of nursing home residents fall each year, often more than once, with an average of 2.6 falls per person per year. See Rubenstein L Z. Preventing Falls in the Nursing Home. *Journal of the American Medical Association,* 278(7):595-6, 1997. That's twice the rate of falls for older adults living in the community, with the potential annual fall rate of 2-3 million/year. Each year, a typical nursing home with 100 beds reports 100 to 200 falls. Many falls go unreported, so the actual numbers are likely higher. 24% of falls in nursing homes result from gait disturbances, walking difficulties and muscle weakness. Many of these nursing home residents suffer a progressive fear of falling, which has been shown to be an independent risk factor for further falls, leading to progressive physical and mental decline, as well as risks inherent to inactivity. See Iinattiniemi S, Jokelainen J, Luukinen H: Falls Risk Among a Very Old Home-Dwelling Population. *Scand J Prim Health Care* 2009; 27(1):25-30.

About 5% of adults 65 and older live in nursing homes, but nursing home residents account for about 20% of deaths from falls in this age group. About 1,800 people living in nursing homes die each year from falls. While statistics from the long term care facilities are hard to track, if we conservatively assume that 50% of the nursing home population will fall (800,000 @ 2.6 falls or ~2 million falls), of which 10% will suffer serious injuries (200,000), the annualized costs (assuming $34,000 for each serious fall) to treat those who have sustained serious falls in nursing home is another $6.8 billion).

The costs to care for serious and non-serious injuries occurring in acute care hospital and long-term care facilities is estimated to be over $10 billion in today's dollars. Prescriptive use of ambulatory aids (such as walkers) and physical therapy (for balance, gait training and strengthening), are often-utilized strategies to protect vulnerable people and patients who may be at risk of falling, whether in the community, hospital, inpatient rehabilitation or long-term care facilities. According to the National Center for Health Statistics, 1.8 million people in the U.S. routinely use a walker for support during routine activities of daily living. This doesn't include those patients (>1 million), who for a variety of reasons, temporarily need to use a walker for a period of time, such as those recovering from knee or hip replacement or hip fracture reparative surgery.

The quandary, however, is that despite these interventions (use of a walker and physical therapy), falls inevitably occur. In fact, falls associated with the use of walking aids may be an "underrecognized public health problem." See Stevens J A, Thomas K, Teh L, Greenspan A I. Unintentional Fall Injuries Associated with Walkers and Canes in Older Adults Treated in U.S. Emergency Departments. *J Am Geriatr Soc.* 57(8):1464-9, 2009. In the geriatric population the risk of falling in inpatient rehabilitation facilities can be as high as 24-30%. See Vassallo M, Sharma J C, Briggs R S and Allen S C. Characteristics of early fallers on elderly patient rehabilitation wards. Age and Ageing, 32:338-342, 2003 and Vieira E R, Freund-Heritage R, da Costa B R. Risk Factors for Geriatric Patient Falls in Rehabilitation Hospital Settings: A Systematic Review. Clinical Rehabilitation, 25: 788-799, 2011.

When analyzing inpatient falls, as many as 87% of patients are using a walker at the time of the fall, and 27% fall while ambulating with staff supervision/assistance. See Pelt C E, Anderson A W, Anderson M B, Dine C V, Peters C L. Postoperative Falls After Total Knee Arthroplasty in Patients with a Femoral Nerve Catheter: Can We Reduce the Incidence? *The Journal of Arthroplasty*, 29:1154-1157, 2014. One out of six falls associated with walkers (16.3%) occur in nursing facilities. Despite multifaceted efforts to reduce falls in patients during hospitalizations, in fact, compared to non-hospitalized persons of comparable ages, the risk of falling and sustaining a hip fracture is 11 times greater in hospitalized patients. The risk of falling again after surgical repair of a hip fracture in geriatric patients is perhaps most concerning, occurring in as many as 31% of patients during the acute hospitalization or stay in a skilled nursing facility. See Berggren M, Englund U, Olofsson B, Nordstrom P, Gustafson Y, Stenvall M. Effects of Geriatric Interdisciplinary Home Rehabilitation on Complications and Readmissions After Hip Fracture: A Randomized Controlled Trial. *Clinical Rehabilitation*, 33(1): 64-73, 2019. After knee and hip replacement surgery, despite appropriate protocols and precautions, the risk of falling during the hospitalization is roughly 0.4%-2.7%. See Memtsoudis S G, Dy C J, Ma Y, Chiu Y L, Della Valle A G, Mazumdar M. In-Hospital Patient Falls After Total Joint Arthroplasty: Incidence, Demographics, and Risk Factors in the United States. *J Arthroplasty*, 27:823-828, 2012 and Wasserstein D, Farlinger C, Brull R, Mahomed N, Gandhi R. Advanced Age, Obesity and Continuous Femoral Nerve Blockade Are Independent Risk Factors for Inpatient Falls After Primary Total Knee Arthroplasty. *J Arthroplasty*, 28:1121-1124, 2013. Those numbers are even greater in older patients transferred to inpatient rehabilitation centers or skilled nursing facilities after total joint surgery. See Vlahov D, Myers A H, al-Ibrahim M S. Epidemiology of Falls Among Patients in a Rehabilitation Hospital. *Arch Phys Med Rehabil*, 71(1):8-12, 1990. Depending on the study, between 2 and 15 falls will occur for every 1000 inpatient days after total knee or hip replacement. See Mandl L A, Lyman S, Quinlan P, Bailey T, Katz J, Magid S K. Falls Among Patients Who Had Elective Orthopaedic Surgery: A Decade of Experience from a Musculoskeletal Specialty Hospital. *J Orthop Sports Phys Ther* 43:91-96, 2013. Most occur during the first two days after surgery, when patients are most carefully supervised, institutionalized and using walkers. See Johnson R L, Duncan C M, Ahn K S, Schroeder D R, Horlocker T T, Kopp S L. Fall-Prevention Strategies and Patient Characteristics That Impact Fall Rates After Total Knee Arthroplasty. *Anesthesia & Analgesia*, 119:1113-1118, 2014.

One can estimate the number of those who may need short-term use of walkers while recovering from lower extremity surgery: 1) Annual incidence of hip fractures in US: 350,000 (most which undergo surgical repair); 2) Total knee and hip replacements/year: >1 million (expected to reach 1.9 million by 2030); 3) Revision total joints/year: >110,000.

Based on these published values and the reported percentages of falling afterwards, the annual incidence of falling within the postoperative period after these procedures alone can cumulatively be as high as 90,000 to 120,000, often while in the hospital or skilled nursing facility, and often while using a walker. These statistics suggest the need for some sort of supplemental method to augment the role of physical therapists, aides, and nursing personnel when mobilizing patients, particularly during the first 2 or 3 days after knee and hip replacement and hip fracture surgery, when most falls occur. Unfortunately, between the aging population, geriatric decline, vast increases in the prevalence of neuromuscular disease and increasing volumes of Orthopedic and spine surgeries, and the growing number of people residing in assisted living/skilled care facilities, the risk of falling, despite using a walker and receiving physical therapy, remains a great concern.

The situation is complicated by the reality that in the United States there is a shortage of physical therapists available to provide services for patients and those persons residing in nursing homes and other care facilities. In 2017, the American Physical Therapy Association (APTA) projected the supply and demand of physical therapists from 2010-2025, estimating a potential shortage of physical therapists by 2025 that could be as high as 26,000, due to an increase in the aging population, growing numbers of patients undergoing knee and hip replacements (and other procedures requiring physical therapy), and growing population with medical ailments requiring physical therapy, without a matched increase in trained physical therapists in the United States. See Luz C, Bush T, Shen X. Do Canes or Walkers Make Any Difference? Non-use and Fall Injuries. *The Gerontologist*, 57:211-218, 2017; Thomas S, Halbert J, MacKintosh S, Cameron I D, Kurrie S, Whitehead C, Miller M, Crotty M. Walking Aid Use after Discharge Following Hip Fracture is Rarely Reviewed and Often Inappropriate: An observational Study. *Journal of Physiotherapy*, 56:267-272, 2010; Ellerbe, R. "A Model to Project the Supply and Demand of Physical Therapists 2010-2025" Apr. 17, 2017, www.apta.org/WorkforceData/ModelDescriptionFigure/;

Jørgensen C C, Kehlet H. Fall-Related Admissions After Fast-Track Total Hip and Knee Arthroplasty—Cause of Concern or Consequence of Success? *Clinical Interventions in Aging*, 8:1569-1577, 2013; and Colombo G, Jörg M, Dietz V. Driven Gait Orthosis to Do Locomotor Training of Paraplegic Patients. *Proceedings of the 22nd Annual EMBS International Conference*, 3159-3163, Chicago, Ill., Jul. 23-28, 2000.

This will put an increasing number of people at risk of falling, particularly in the initial few days after surgery. Physical therapy is paramount for training patients to ambulate safely, maintain reasonable balance and minimize the risk of falling. Often, in the acute postoperative period while hospitalized, two physical therapists (or a physical therapist with one aid) will assist a patient while ambulating, to ensure a reasonable level of safety. This means, that when patients are most in need of a physical therapist for support and training during ambulation, they may not be available. Additionally, after total knee and hip replacement surgery, as well as hip fracture surgery, the relative understaffing of in-hospital physical therapists limits the preferred number of daily physical therapy sessions, which would be optimal to enhance outcomes, accelerate recovery and accomplish safe and early discharge.

How do we reconcile the increasing prevalence of long-term, mobility impaired, walker-dependent (often geriatric) people in the general population, many of whom reside in long-term care facilities, and the growing number of patients who need to use walkers for a variable period of time after surgical interventions—whom are temporarily at risk of falling, particularly when hospitalized or convalescing in skilled nursing or acute rehabilitation facilities—with the impending shortage of physical therapists, who may not be available to adequately train or supervise these at-risk people? Robotic assistance is the answer, serving a role in reducing the physical strain and time burden on physical therapists, improving the safety of ambulation, and reducing the risk of falling when using a walker or cane.

Research in the field of robot-assisted walking can be divided into several categories based upon the type and purpose of the device. We review only the ones relevant to this disclosure.

Exoskeleton and Overhead Harness Support Systems and Research

For subjects with severe lower extremity neuromuscular disorders—primarily stroke, spinal cord injury, and traumatic brain injury, and to a lesser extent cerebral palsy, multiple sclerosis, and severe Parkinson's Disease—robotic gait assistance has primarily been in the form of exoskeletons or external overhead autonomous support harnesses.

A driven gait orthosis was developed that can move a subject's legs on a treadmill. Another device called HAL (Hybrid Assistive Leg) was developed to provide walking aid for people with gait disorder. HAL is integrated with the human subject and has a hybrid control system that consists of autonomous posture control and a comfortable power assist controller based on biological feedback and predictive feed forward. See Kawamoto H. Comfortable Power Assist Control Method for Walking Aid by HAL-3. *IEEE International Conference on Systems, Man and Cybernetics*, 4:447-452, 2002; Kawamoto H, Lee S, Kanbe S, Sankai Y. Power Assist Method for HAL-3 using EMG-based Feedback Controller. *International Conference on Control, Automation and Systems*, 648-1653, 2003; Kawamoto H, Sankai Y. EMG-based Hybrid Assistive Leg for Walking Aid Using Feedforward Controller. *International Conference on Control, Automation and Systems*, 190-203, 2001; and Kawamoto H, Sankai Y. Power Assist System HAL-3 for Gait Disorder Person. *Computers Helping People with Special Needs 8th International Conference; Proceedings Lecture Notes in Computer Science*, Vol. 2398, 196-203, 2002.

Other exoskeletal devices include those developed by Yamamoto and colleagues for nurses and powered orthoses developed at the University of Michigan. See Yamamoto K, Ishii M, Noborisaka H, Hyodo K. Stand Alone Wearable Power Assisting Suit—Sensing and Control Systems. *Proceedings of IEEE International Workshop on Robot and Human Interactive Communication*, 661-666, 2004 and Ferris D, Sawicki G, Domingo A. Powered Lower Limb Orthoses for Gait Rehabilitation. *Topics in Spinal Cord Injury Rehabilitation*, 11(2):34-49, 2005. Researchers have suggested an exoskeletal power-assistance device for the knee using a series of elastic actuators, and a lightweight exoskeleton that uses adjustable graphite/epoxy struts and is attached to the body by belts. See Pratt J, Krupp B, Morse J, Collins S. The Roboknee: An Exoskeleton for Enhancing Strength and Endurance During Walking. *Proceedings of IEEE International Conference on Robotics and Automation*, 2430-2435, 2004 and Bar-Cohen Y, Mavrodis C, Melli-Huber J, Fisch A. Lightweight exoskeletons with controllable actuators, Tech Briefs, Mechanical & Fluid Systems, *Engineering Solutions for Design & Manufacturing*, 2004.

Recent commercially available exoskeletons offered specifically for lower extremity rehabilitation include Lokomat (www.hocoma.com/us/solutions/lokomat/), EKSO39 (eksobionics.com), ReWalk (rewalk.com), and HAL (www.cyberdyne.jp/english/products/HAL). Meanwhile, external overhead autonomous support harnesses such as Andago (www.hocoma.com/us/solutions/andago/) and G-EO (http://neuro-concept.ca/en/technologies/g-eo-system/) are also available commercially. However, all the devices mentioned so far tend to be either costly, bulky, used exclusively for indoor therapy and training (not for functional activities), or used for those with profound levels of disease and/or disability. They are not practical for subjects with a higher level of ambulation capacity and muscular strength, but who nonetheless represent a fall risk and need some added protection against falling in everyday environments rather than a mechanism to "make them walk."

Research in Devices that Deal with Falling

While the penetration of robotics in rehabilitation is already being realized for the most significantly disabled, there is currently no practical robotic protective mechanism for millions of elderly people who are ambulating with a walker or cane for varying stages of chronic gait dysfunction (caused by chronic disease or geriatric decline) or those subjects each year who undergo surgical treatments such as knee and hip joint replacement, spinal surgery and hip fracture surgery, during a vulnerable period while they are using a conventional walker and at greatest risk of falling. There is tremendous untapped potential for a different sort of rehabilitation robot to augment conventional physical therapy and to autonomously prevent falls in millions of at-risk subjects that ambulate with a walker short-term or long-term—in a way that is different than exoskeleton robotic devices referenced above.

Airbag technologies are being tested to "cushion the fall." The Helite (helite.com), Tango Belt (https://www.tangobelt.com), and Hip-Hope (https://www.hip-hope.com) are all examples of such airbag technologies.

A companion robot is being tested to help pick up an individual who has fallen. See UniSA's Robot Pick-me-up Aims to Reduce Falls, University of South Australia Media Release, Oct. 10, 2017 at https://www.unisa.edu.au/Media- Centre/Releases/2017-Media-Releases/UniSAs-robot-pick-me-up-aims-to-reduce-falls/. There is also a robotic augmented walker in development at Carnegie Mellon University, which returns to the user when signaled by remote control, but otherwise serves as a conventional walker. See Glover, Jared et al., A Robotically-Augmented Walker for Older Adults, Carnegie Mellon University, Aug. 1, 2003 at https://kilthub.cmu.edu/articles/A_robotically-augmented_walker_for_older_adults/6591308/1. The first two technologies do not serve to limit falls, and while the airbag technologies may reduce the risk of hip fractures from falls, they do not prevent other potentially severe consequences such has brain or neck injury; the latter technology does not augment the walker to further protect against falls, other than improving accessibility of the walker.

Research in Robot Guided Walking

Recently, a team of researchers at Columbia University have introduced a robotic cane, called CANINE, that can help "provide light-touch assistance in walking to the aged and others with impaired mobility." See Stramel D M, Carrera R M, Rahok S A, Stein J, Agrawal S K. Effects of a Person-Following Light-Touch Device During Overground Walking with Visual Perturbations in a Virtual Reality Environment. *IEEE Robotics and Automation Letters*, 4(4):4139-4146, 2019.

This robotic cane purports to provide proprioceptive signals to an assisted person, thus improving their stability when the user experiences discordant visual feedback. Unlike the system disclosed herein, it will not be useful for most subjects in the initial days and weeks while recovering from major lower extremity joint replacement or reparative hip fracture surgery, or in many geriatric people, when use of a walker is required for more substantial support. The robotic cane will not prevent a person from falling to the same extent as the system disclosed herein. Furthermore, turns with such a device will be cumbersome and require training since the individual must keep one arm on the mobile cane and the cane must realize the direction of gait. Other autonomous mobile robotic gait assistants, in the structure of a pushcart or walker, are under development, with varying stages of prototype development. See Pollack, Martha E., Pearl: A mobile Robotic Assistant for the Elderly, 2002, at https://www.cs.cmu.edu/~flo/papers/umich/aaai02wkshp.pdf; Ihn-Sik Weon; Soon-Geul Lee. Intelligent Robotic Walker with Actively Controlled Human Interaction. First published: Aug. 7, 2018 at https://doi.org/10.4218/etrij.2017-0329; and Werner C, Moustris G P, Tzafestas C S, Hauer K. User-Oriented Evaluation of a Robotic Rollator That Provides Navigation Assistance in Frail Older Adults with and without Cognitive Impairment. *Gerontology* 2018, 64:278-290.

Therefore, a solution is needed which addresses the above shortcomings and disadvantages. Such a solution should be safe, effective, and easy for elderly users to operate.

SUMMARY

The present disclosure relates to an autonomous robotic mobile support system used to stop falls in and provide support to mobility-impaired or geriatric users. One objective of the autonomous robotic mobile support system is to help protect subjects at risk of falling while ambulating with a walker or other assistive support. The system can be used in a hospital setting, long-term care facility, or other type of healthcare facility.

The system can comprise a mobile base vehicle comprising two differentially driven wheels, a robotic arm coupled to the mobile base vehicle and extending from the mobile base vehicle in a direction of a subject, a LIDAR sensor coupled to the robotic arm, and an onboard computing device. The robotic arm can comprise an end effector configured to support the subject in the event of a fall. The LIDAR sensor can be configured to undertake distance measurements between the LIDAR sensor and defined points along a dorsum region of the subject. The onboard computing device can comprise one or more processors and memory units. The one or more processors can be programmed to execute instructions stored in the one or more memory units to use the distance measurements from the LIDAR sensor to generate commands to adjust at least one of a speed and direction of the mobile base vehicle in response to a movement of the subject to allow the robotic mobile support system to autonomously follow the subject from a posterior direction and support the subject in the event of a fall.

The end effector can comprise a padded back support and padded adjustable side supports. The padded back support can be configured to support the subject in the event of a backward fall. The padded adjustable side supports can be configured to support the subject in the event of a lateral fall. A length of the robotic arm can be adjusted to adapt to a height of the subject. A width separating the padded adjustable side supports can be adjusted to adapt to a girth of the subject.

A plurality of geared servomotors can be configured to operate the robotic arm including the end effector. Moreover, the one or more processors can be programmed to execute further instructions to generate a command to rotate the end effector with respect to a horizontal orientation plane using one of the plurality of geared servomotors in response to an initial rotation of the end effector caused by a lateral fall of the subject. The end effector can be rotated using the geared servomotors when the initial rotation is beyond or exceeds a preset threshold rotation value.

The one or more processors of the onboard computing device (or another microcontroller or control unit) can be programmed to execute further instructions to determine a forward velocity ($v_x$) of the mobile base vehicle using the equation:

$$v_x = k1*(x\text{lmin} - \text{dist})$$

where xlmin is a minimum distance from a set of distance measurements made by the LIDAR sensor (e.g., distance measurements between the LIDAR sensor and the defined points along the dorsum region of the subject), dist is a predefined desired distance, and k1 is a first proportional control gain. The proportional control gain can be a ratio of an output response to an error signal.

The one or more processors can be programmed to execute further instructions to determine an angular velocity (w) of the mobile base vehicle using the equation:

$$\omega = k2 * \frac{\phi_2 + \phi_3}{2}$$

where k2 is a second proportional control gain, and $\phi_2$ and $\phi_3$ are angles of rotation of the subject determined by the equations:

$$\phi_2 = \mathrm{atan}\left[\dfrac{\left[\begin{array}{l}xl(\text{first selected defined point}) - \\ xl(\text{second selected defined point})\end{array}\right]}{\left[\begin{array}{l}yl(\text{first selected defined point}) - \\ yl(\text{second selected defined point})\end{array}\right]}\right]$$

$$\phi_3 = \mathrm{atan}\left[\dfrac{\left[\begin{array}{l}xl(\text{third selected defined point}) - \\ xl(\text{fourth selected defined point})\end{array}\right]}{\left[\begin{array}{l}yl(\text{third selected defined point}) - \\ yl(\text{fourth selected defined point})\end{array}\right]}\right]$$

where yl and xl represent the (y, x) position of the defined points across the dorsum of the subject as measured by the LIDAR sensor, an origin is located at a center of the LIDAR sensor, x(i) represents a distance to a selected defined point in the x-direction where the positive x-axis is directly in front of the LIDAR sensor, and y(i) represents a distance to the selected defined point in the y-direction where the positive y-axis is toward a right-hand side of the subject.

The one or more processors can also be programmed to execute further instructions to determine a right wheel angular velocity ($\omega_R$) of a right wheel of the two differentially driven wheels and determine a left wheel angular velocity ($\omega_L$) of a left wheel of the two differentially driven wheels, using the equations:

$$\omega_R = \dfrac{v_x + h\omega}{R_w}$$

$$\omega_L = \dfrac{v_x - h\omega}{R_w}$$

where $\omega$ is the angular velocity, h is one-half of a distance separating the two differentially driven wheels, and $R_w$ is a radius of at least one of the differentially driven wheels.

The one or more processors can also be programmed to execute further instructions to determine a left wheel revolutions per minute ($\text{RPM}_{L\_Des}$) of the left wheel of the two differentially driven wheels and a right wheel revolutions per minute ($\text{RPM}_{R\_Des}$) of the right wheel of the two differentially driven wheels using the following equations:

$$\text{RPM}_{L\_Des} = \dfrac{\omega_L * 30}{\pi}$$

$$\text{RPM}_{R\_Des} = \dfrac{\omega_R * 30}{\pi}$$

where $\omega_R$ is the right wheel angular velocity and $\omega_L$ is the left wheel angular velocity.

A minimum weight of the mobile base vehicle can be determined by a height of the subject (H), a weight of the subject (WP), and the equation:

Minimum Weight of Mobile Base Vehicle = $H*WP*\sin \beta/(2h)$ where $\beta$ is a tilt angle of the subject as measured from an upright position, and h is one-half of a distance separating the two differentially driven wheels.

The system can further comprise a leg LIDAR sensor positioned on the mobile base vehicle and configured to undertake distance measurements between the leg LIDAR sensor and defined points along a leg region of the subject.

The onboard computing device can further comprise a wireless communication module configured to receive commands from a radio frequency (RF) transmitter. Movement of the mobile base vehicle can be halted in response to an emergency stop command received from the RF transmitter via the wireless communication module.

Disclosed is also a method of supporting a mobility-impaired subject. The subject can comprise measuring, using a LIDAR sensor, distances between the LIDAR sensor and defined points along a dorsum region of the subject. The LIDAR sensor can be coupled to a robotic arm extending from a mobile base vehicle in a direction of the subject. The mobile base vehicle, the LIDAR sensor, and the robotic arm can be part of a robotic mobile support system. The robotic arm can comprise an end effector configured to support the subject in the event of a fall.

The method can also comprise generating commands to adjust at least one of a speed and direction of the mobile base vehicle, using one or more processors of an onboard computing device of the robotic mobile support system, based on the distance measurements made by the LIDAR sensor in response to a movement of the subject to allow the robotic mobile support system to autonomously follow the subject from a posterior direction and support the subject in the event of a fall.

The method can further comprise determining, using the one or more processors, a forward velocity (vx) of the mobile base vehicle using the equation:

$$v_x = k1 * (xl\text{min} - \text{dist})$$

where xlmin is a minimum distance from a set of distance measurements made by the LIDAR sensor, dist is a predefined desired distance, and k1 is a first proportional control gain.

The method can also comprise determining, using the one or more processors, an angular velocity ($\omega$) of the mobile base vehicle using the equation:

$$\omega = k2 * \dfrac{\phi_2 + \phi_3}{2}$$

where k2 is a second proportional control gain, and $\phi_2$ and $\phi_3$ are angles of rotation of the subject determined by the equations:

$$\phi_2 = \mathrm{atan}\left[\dfrac{\left[\begin{array}{l}xl(\text{first selected defined point}) - \\ xl(\text{second selected defined point})\end{array}\right]}{\left[\begin{array}{l}yl(\text{first selected defined point}) - \\ yl(\text{second selected defined point})\end{array}\right]}\right]$$

$$\phi_3 = \mathrm{atan}\left[\dfrac{\left[\begin{array}{l}xl(\text{third selected defined point}) - \\ xl(\text{fourth selected defined point})\end{array}\right]}{\left[\begin{array}{l}yl(\text{third selected defined point}) - \\ yl(\text{fourth selected defined point})\end{array}\right]}\right]$$

and where yl and xl represent the (y, x) position of the defined points across the dorsum of the subject as measured by the LIDAR sensor. An origin can be located at a center of the LIDAR sensor, x(i) represents a distance to a selected defined point in the x-direction where the positive x-axis is directly in front of the LIDAR sensor, and y(i) represents a distance to the selected defined point in the y-direction where the positive y-axis is toward a right-hand side of the subject.

The method can further comprise determining, using the one or more processors, a right wheel angular velocity ($\omega_R$)

of a right wheel of the two differentially driven wheels and a left wheel angular velocity ($\omega_L$) of a left wheel of the two differentially driven wheels, using the equations:

$$\omega_R = \frac{v_x + h\omega}{R_w}$$

$$\omega_L = \frac{v_x - h\omega}{R_w}$$

where $\omega$ is the angular velocity, where h is one-half of a distance separating the two differentially driven wheels, and $R_w$ is a radius of at least one of the differentially driven wheels.

The method can also comprise determining, using the one or more processors, a left wheel revolutions per minute ($RPM_{L\_Des}$) of the left wheel of the two differentially driven wheels and a right wheel revolutions per minute ($RPM_{R\_Des}$) of the right wheel of the two differentially driven wheels using the following equations:

$$RPM_{L\_Des} = \frac{\omega_L * 30}{\pi}$$

$$RPM_{R\_Des} = \frac{\omega_R * 30}{\pi}$$

where $\omega_R$ is the right wheel angular velocity and $\omega_L$ is the left wheel angular velocity.

The method can further comprise determining a minimum weight of the mobile base vehicle using the equation:

Minimum Weight of Mobile Base Vehicle=$H*WP*\sin \beta/(2h)$ where H is a height of the subject, WP is a weight of the subject, $\beta$ is a tilt angle of the subject as measured from an upright position, and h is one-half of a distance separating the two differentially driven wheels.

The method can also comprise measuring, using a leg LIDAR sensor positioned on the mobile base vehicle, distances between the leg LIDAR sensor and defined points along a leg region of the subject. The method can further comprise receiving an emergency stop command from a radio frequency transmitter via a wireless communication module of the onboard computing device. Power to the plurality of direct current (DC) motors can be shut off in response to the emergency stop command.

DETAILED DESCRIPTION

Figure 1:
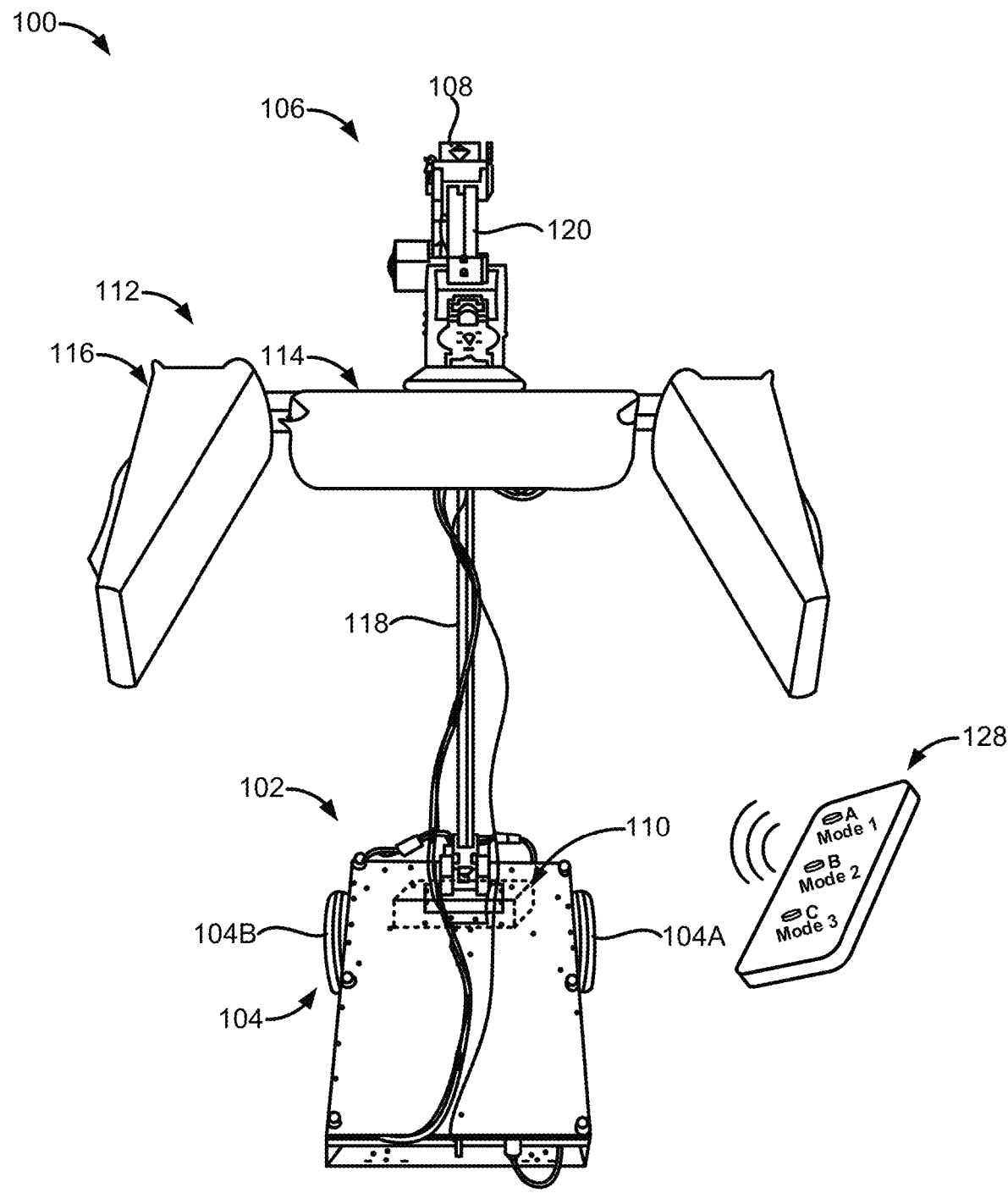
FIG. 1 illustrates a front perspective view of an implementation of an autonomous robotic mobile support system.

FIG. 1 illustrates a front perspective view of an implementation of an autonomous robotic mobile support system 100. The system 100 can be used to stop falls in and provide support to mobility-impaired or geriatric subjects. The system 100 can be used in a hospital setting, long-term care facility, or other type of healthcare facility. The system 100 can autonomously follow a mobility-impaired subject and dynamically react to a sudden motion or movement of the subject to stop the subject from falling. The system 100 can provide support to subjects using a mobility aid such as a walker or rollator.

Figure 2:
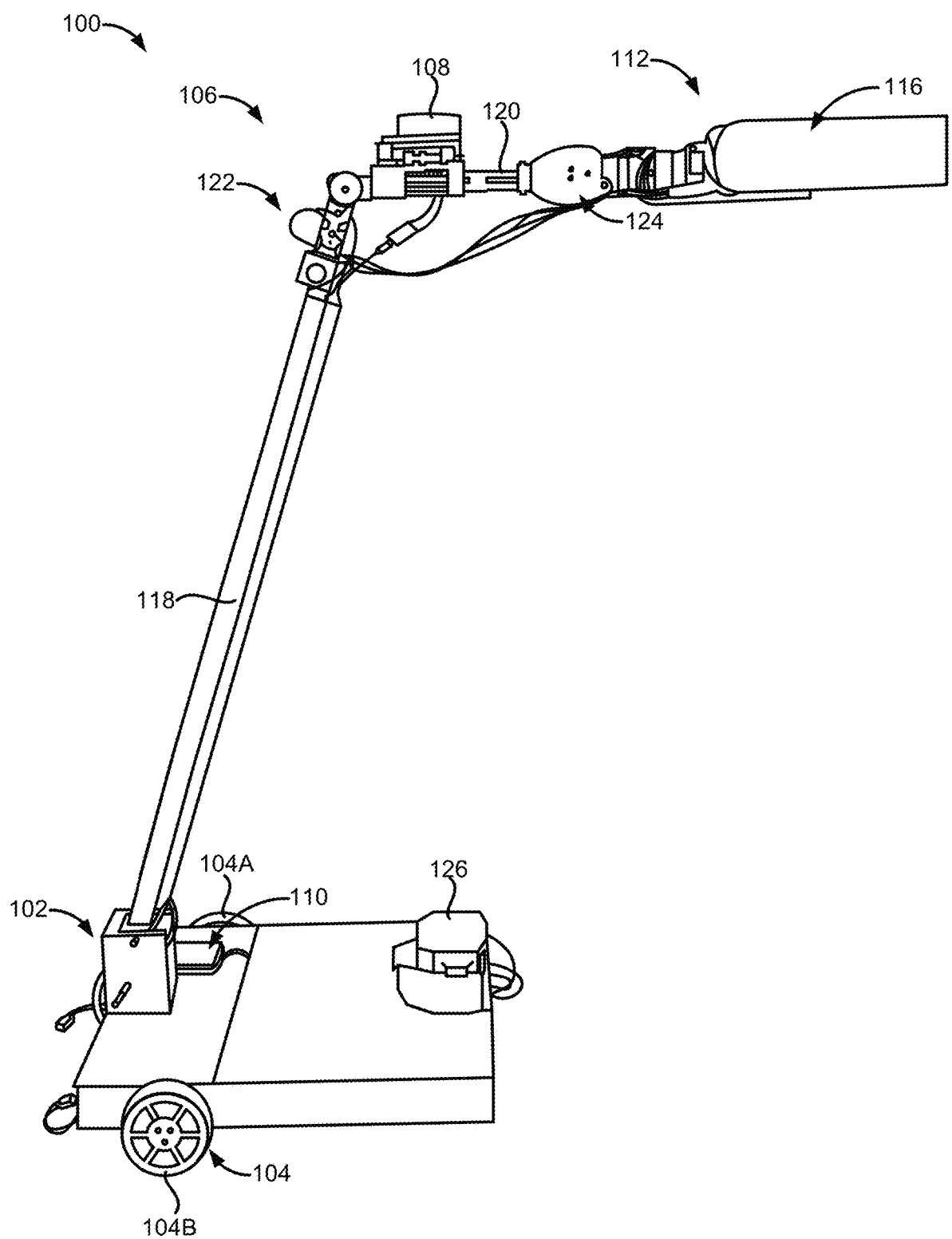
FIG. 2 illustrates a side perspective view of an implementation of the autonomous robotic mobile support system.

FIG. 2 illustrates a side perspective view of an implementation of the autonomous robotic mobile support system 100. FIGS. 1 and 2 illustrate that the system 100 can comprise a mobile base vehicle 102 comprising two differentially driven wheels 104, a robotic arm 106 coupled to the mobile base vehicle 102 and extending from the mobile base vehicle 102 in a direction of a subject. The system 100 can also comprise a LIDAR sensor 108 coupled to the robotic arm 106 and an onboard computing device 110.

In some implementations, the onboard computing device 110 can be coupled to the mobile base vehicle 102. In other implementations, the onboard computing device 110 can be coupled to the robotic arm 106. The onboard computing device 110 can comprise one or more processors and memory units. The one or more processors can be programmed to execute instructions stored in the one or more memory units to control the autonomous operation of the robotic mobile support system 100.

The robotic arm 106 can comprise an end effector 112 configured to support the subject in the event of a fall. The end effector 112 can comprise a padded back support 114 and padded adjustable side supports 116.

The padded back support 114 can be configured to support the subject in the event of a backward fall. The padded side supports 116 can be configured to support the subject in the event of a lateral fall.

A length of the robotic arm 106 can be adjusted to adapt to a height of the subject. A width separating the padded side supports 116 can be adjusted to adapt to a girth of the subject.

The robotic arm 106 can comprise a base arm linkage 118 or segment (also referred to in this disclosure as "link 0"), a first arm linkage 120 or segment (also referred to in this disclosure as "link 1"), and a second arm linkage or segment (also referred to in this disclosure as "link 2" or the end effector 112).

A plurality of geared servomotors can be configured to operate the robotic arm 106 including the end effector 112. The plurality of geared servomotors can comprise a first servomotor 122 (also referred to in this disclosure as "servo 1") and a second servomotor 124 (also referred to in this disclosure as "servo 2"). The one or more processors can be programmed to execute further instructions to generate a command to rotate the end effector 112 with respect to a horizontal orientation plane using one of the second servomotor 124 in response to an initial rotation of the end effector 112 caused by the subject applying a force (by putting the subject's weight) on one of the side supports 116 due to a fall or the subject losing his/her balance. The end effector 112 can then be rotated back to a default starting position using the second servomotor 124 when the initial rotation is beyond or exceeds a preset threshold rotation value.

The base arm linkage 118 or segment ("link 0") of the robotic arm 106 can be coupled to the mobile base vehicle 102. The length of the base arm linkage 118 can be adjustable or extendible to accommodate a height of the subject. The base arm linkage 118 can be positioned or otherwise set at an angle with respect to a top of the mobile base vehicle 102. The angle can be adjusted to accommodate a height of the subject. When the system 100 autonomously follows the subject, the base arm linkage 118 can be substantially aligned with a sagittal plane of the subject.

The first arm linkage 120 can be coupled to the base arm linkage 118. The first arm linkage 120 can be rotatable with respect to the base arm linkage 118. The first servomotor 122 can rotate the first arm linkage 120 along the sagittal plane. The first arm linkage 120 can also be rotated manually.

The base arm linkage 118, the first arm linkage 120, or a combination thereof can be made in part of a rigid material. For example, the base arm linkage 118, the first arm linkage 120, or a combination thereof can be made in part of a rigid metallic material. As a more specific example, the base arm linkage 118, the first arm linkage 120, or a combination thereof can be made in part of an aluminum alloy (e.g., 6105-T5 aluminum alloy), stainless steel, or titanium.

In some implementations, the base arm linkage 118 and the first arm linkage 120 can be made of metal T-slot frames. For example, the base arm linkage 118 and the first arm linkage 120 can be made of metal T-slot frames (made of 6105-T5 aluminum alloy) provided by 80/20 Inc. (Part No. 2020).

The angle made by the first arm linkage 120 with respect the base arm linkage 118 can be adjusted until the end effector 112 is oriented substantially horizontal or parallel to the floor. The first arm linkage 120 can be locked in place when the robotic arm 106 is adjusted (the length of the base arm linkage 118 and the angles are adjusted) to accommodate a height of the subject.

The robotic arm 106, including the length of the base arm linkage 118 and the various linkage angles can be adjusted until the height of the end effector 112 is at the waist of the subject and the end effector 112 is oriented substantially parallel to the floor.

The LIDAR sensor 108 can be configured to undertake distance measurements between the LIDAR sensor 108 and defined points along a dorsum region of the subject. The one or more processors of the onboard computing device 110 can be programmed to execute instructions stored in the one or more memory units to use the distance measurements from the LIDAR sensor 108 to generate commands to adjust at least one of a speed and direction of the mobile base vehicle 102 in response to a movement of the subject to allow the robotic mobile support system 100 to autonomously follow the subject from a posterior direction and support the subject in the event of a fall.

The LIDAR sensor 108 can be a two-dimensional (2D) LIDAR sensor. The LIDAR sensor 108 can have a scanning range of up to 8 meters. The LIDAR sensor 108 can undertake distance measurements in an indoor environment and outdoor environment. The LIDAR sensor 108 can operate based on laser triangulation. For example, the LIDAR sensor 1008 can emit a modulated infrared laser light (see, e.g., FIG. 8) at a target (e.g., the subject) and the laser light can be reflected by the target back to the sensor to be detected. The returning light signal can be sampled by one or more processors within the LIDAR sensor 108 and/or by the onboard computing device 110. The infrared laser light (see, e.g., FIG. 8) can have a laser wavelength of between about 775 nm and 795 nm (e.g., about 785 nm).

The system 100 can further comprise a leg LIDAR sensor 126 (see, e.g., FIG. 2) positioned on the mobile base vehicle 102 and configured to undertake distance measurements between the leg LIDAR sensor 126 and defined points along a leg region of the subject.

The onboard computing device 110 can further comprise a wireless communication module configured to receive commands from a radio frequency (RF) transmitter 128. Movement of the mobile base vehicle 102 can be halted in response to an emergency stop command received from the RF transmitter 128 via the wireless communication module.

The system 100 can provide support to subjects using a mobility aid such as a walker or rollator. This is because a walker or rollator can help the subject avoid falling forward while the system 100 stops the subject from falling sideways or backward (the directions of most falls). The system 100 can be configured such that the mobile base vehicle 102 autonomously follows the subject and adjust its speed and direction such that it always stays a safe constant distance behind the subject and not interfere with the subject. The robotic arm 106 of the system 100 can be configured to not make physical contact with the subject until the subject requires supportive assistance. Components of the robotic arm 106 can be configured such that they can easily be adjusted to accommodate the height and girth of most subjects.

In addition to the components disclosed above, the system 100 can also comprise passive caster wheels 300 (see, e.g., FIGS. 3 and 4) positioned near the front of the mobile base vehicle 102, one or more batteries carried by the mobile base vehicle 102, a microcontroller, motor drivers, a servomotor power hub, a servomotor adapter board, a switch, a voltage display unit, a voltage regulator, encoders and decoders, an RF receiver (serving as the wireless communication module), and a charging apparatus for charging the batteries.

The differentially driven wheels 104 can be driven by electric motors (e.g., direct current (DC) motors) which are controlled via a dual motor driver. The motor driver receives the wheel speed commands from a microcontroller and directs the motors to rotate the wheels 104 as commanded. The wheel commands are passed to the microcontroller from the onboard computing device 110 where the autonomous control system software resides.

The LIDAR sensor 108 can be positioned on top of the robotic arm 106. For example, the LIDAR sensor 108 can be positioned on top of the first arm linkage 120. The LIDAR sensor 108 can be positioned on the top of the robotic arm 106 (e.g., on the top of the first arm linkage 120) such that the LIDAR sensor 108 can measure the distance between the LIDAR sensor 108 and defined points 700 (see, e.g., FIG. 7A) along a dorsum region or posterior truncal region of the subject without obstruction. The dorsum region can refer to a back of the subject (including a region encompassing any of the trapezius or latissimus dorsi), a posterior waist region of the subject, and a posterior upper hip region of the subject.

In other implementations, the LIDAR sensor 108 or an additional LIDAR sensor can be positioned below the end effector 112 or below the first arm linkage 120 such that the LIDAR sensor 108 or the additional LIDAR sensor can measure the distance between the LIDAR sensor 108 and defined points 700 along a waist or posterior hip region of the subject without obstruction. For example, the LIDAR sensor 108 or the additional LIDAR sensor can measure the distance between the LIDAR sensor 108 and defined points 700 along a lumbar or sacral region of the subject.

Data from any of the LIDAR sensor 108, the leg LIDAR sensor 126, and the additional LIDAR sensor can be transmitted to the onboard computing device 110 for processing. As will be discussed in more detail in the following sections, a plurality of algorithms and equations can determine a distance of the subject to the LIDAR sensor(s) (and by extension, the system 100), a speed of the subject, and the subject's direction of motion. The control system software can reside in the memory units of the onboard computing device 110 and can instruct the one or more processors to use the processed LIDAR data to determine the required wheel speeds of the differentially driven wheels 104 to follow the mobility-impaired subject. Signals concerning the wheel speeds can then be passed on to the microcontroller where other algorithms ensure timely adjustment of wheel speed commands through the motor driver that drives the DC motors and, consequently, the wheels 104.

The system 100 can be configured such that if the subject starts falling backward (as determined by the one or more processors of the onboard computing device 110 using distance measurements from the LIDAR sensor 108), the mobile base vehicle 102 can advance forward and the soft padded back support 114 of the end effector 112 can push the subject's waist forward to prevent the subject from falling. The system 100 can also be configured such that if the subject starts falling sideways (for example, as little as 2 to 5 degrees), the second servomotor 124 rotates the end effector 112 (in a plane approximately parallel with the floor) and at least one of the soft padded side supports 116 pushes the subject back toward the upright position.

The system 100 can be powered by one or more batteries. The batteries can power the various motors and onboard electronic components. The batteries can be rechargeable and allow the system 100 to be recharged while not in use and overnight. Spare batteries can also be used, if required, for uninterrupted operation of the system 100 while the original batteries recharge.

In some implementations, the system 100 can be powered by two 3000 mAh 11.1v lithium polymer (LiPo) batteries. The two LiPo batteries can power the DC motors, servomotors, motor drivers, microcontroller, and onboard computing device 110, and any other electronic component requiring power.

The operation time of the batteries in hours can be calculated as follows: Time=C/A, where C is the capacitance of the battery in amp-hours, and A is the average current draw.

The system 100 can comprise three modes of operation. The three modes of operation can be selected by the subject or a user (e.g., a healthcare professional) using an RF transmitter 128.

The primary mode of operation can be an autonomous mode. After selecting this mode, the system 100 will not become active unless the subject is properly positioned within the end effector 112 of the robotic arm 106. For example, the subject can be properly positioned within the end effector 112 when the waist or a truncal region of the subject is surrounded on three sides by the back support 114 and the side supports 116. The system 100 can use the LIDAR sensor 108 and the onboard computing device 110 to determine whether the subject is properly positioned within the end effector 112.

The second mode can be a remote-control mode. This mode can be used to move the system 100 from a storage or charging location to the operation area for use by the subject. The operator (e.g., a caregiver or other medical professional) can communicate with the system 100 by applying user input to the RF transmitter 128.

The third mode can be an emergency stop (or E-Stop) mode. The emergency stop mode can be a default mode of the system 100. In order to operate the system 100, the emergency stop mode has to be turned off by pressing a button on the RF transmitter 128 instructing the system 100 to enter another mode. Once the system 100 is in operation in another mode, an emergency stop button can be pressed to shut power to the DC motors and stop the mobile base vehicle 102 from moving (at which point, the system 100 is once again in the emergency stop mode).

The RF transmitter 128 can be a handheld RF transmitter. In some implementations, the handheld RF transmitter can be a specialized controller or remote control having four push buttons. For example, the buttons can be marked "A," "B," and "C." Pressing the A button can command the system 100 to enter the autonomous mode and the system 100 can become active when the subject is properly positioned within the end effector 112 as discussed above. Pressing the B button can command the system 100 to enter the emergency stop mode. Power to the DC motors can be immediately shut down once the B button has been pressed. Pressing the C button can command the system 100 to enter the remote-control mode.

The system 100 can further comprise a touch screen display (e.g., a light-emitting diode (LED) or liquid crystal display (LCD) display). The touch screen display can be coupled to the mobile base vehicle 102 or to at least part of the robotic arm 106. The touch screen display can be electrically coupled or in electrical communication with the onboard computing device 110. The touch screen display can provide useful information concerning the system 100 to the subject or a healthcare professional including a distance traveled by the subject, how often the subject required assistance (how often the system 100 engaged the subject to potentially prevent a fall), error messages during operation, and the current mode of operation of the system 100.

Figure 3:
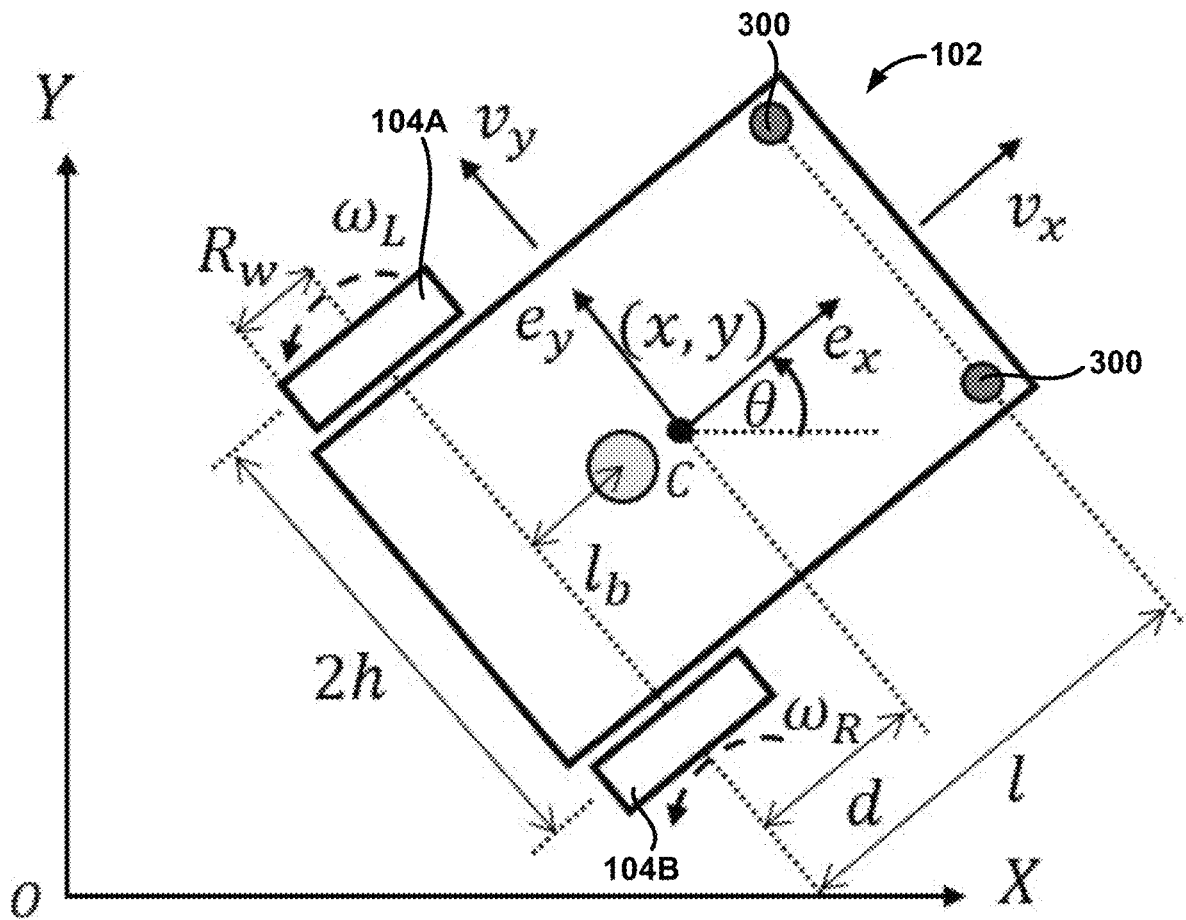
FIG. 3 is a schematic drawing illustrating a top of a mobile base vehicle of the autonomous robotic mobile support system and showing certain geometric parameters for mathematical modeling.

FIG. 3 is a schematic drawing illustrating the top of the mobile base vehicle 102. As will be discussed in more detail in the following sections, FIG. 3 depicts certain dimensions and geometric parameters of the mobile base vehicle 102 for mathematical modeling. Table 1 below provides example measurements for one implementation of the mobile base vehicle 102.

Figure 4:
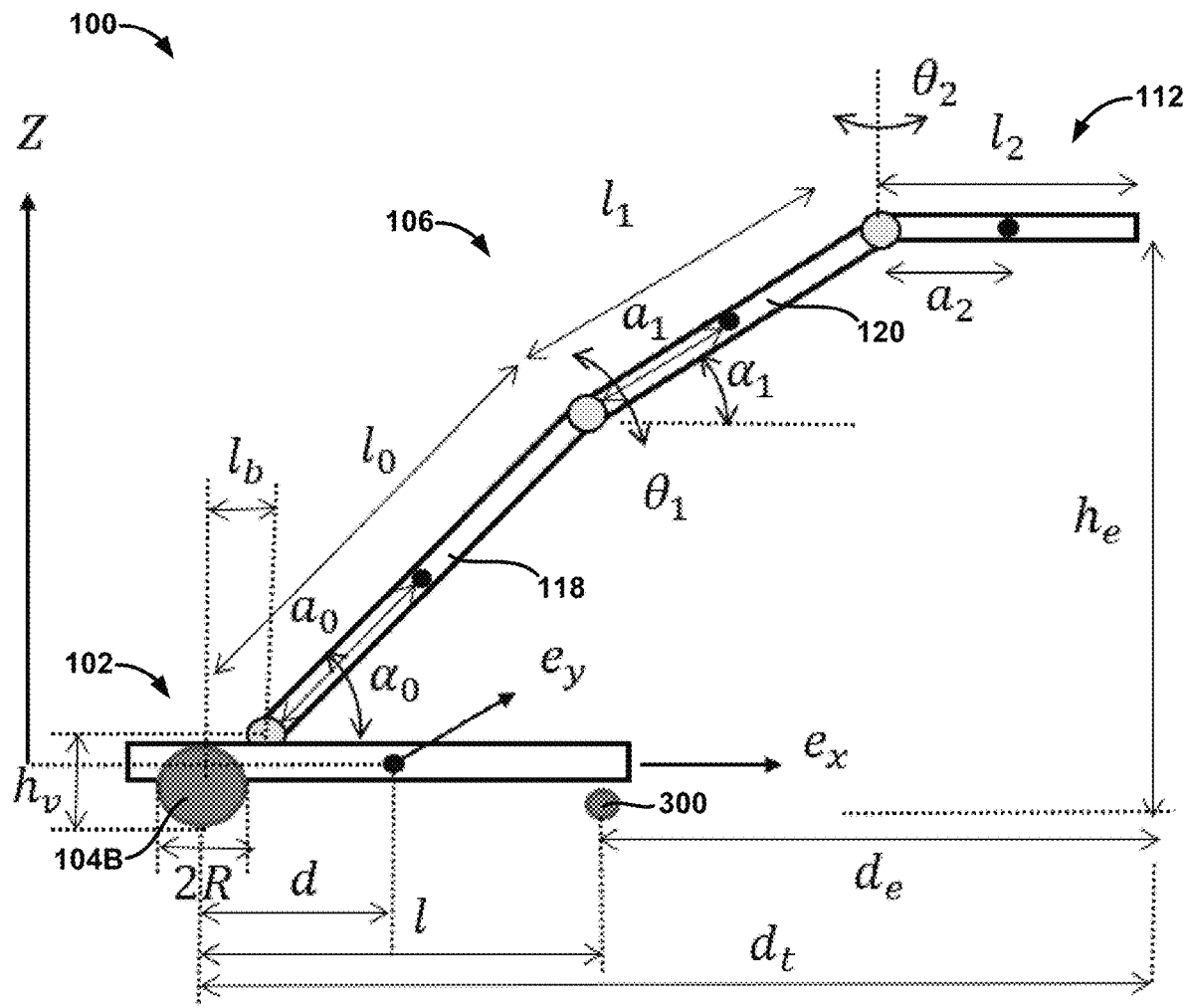
FIG. 4 is a schematic drawing illustrating a side of the autonomous robotic mobile support system and showing certain geometric parameters for mathematical modeling.

FIG. 4 is a schematic drawing illustrating the side of the autonomous robotic mobile support system 100. As will be discussed in more detail in the following sections, FIG. 4 depicts certain dimensions and geometric parameters of the system 100 for mathematical modeling. Table 1 below provides example measurements for one implementation of system 100.

Figure 5A:
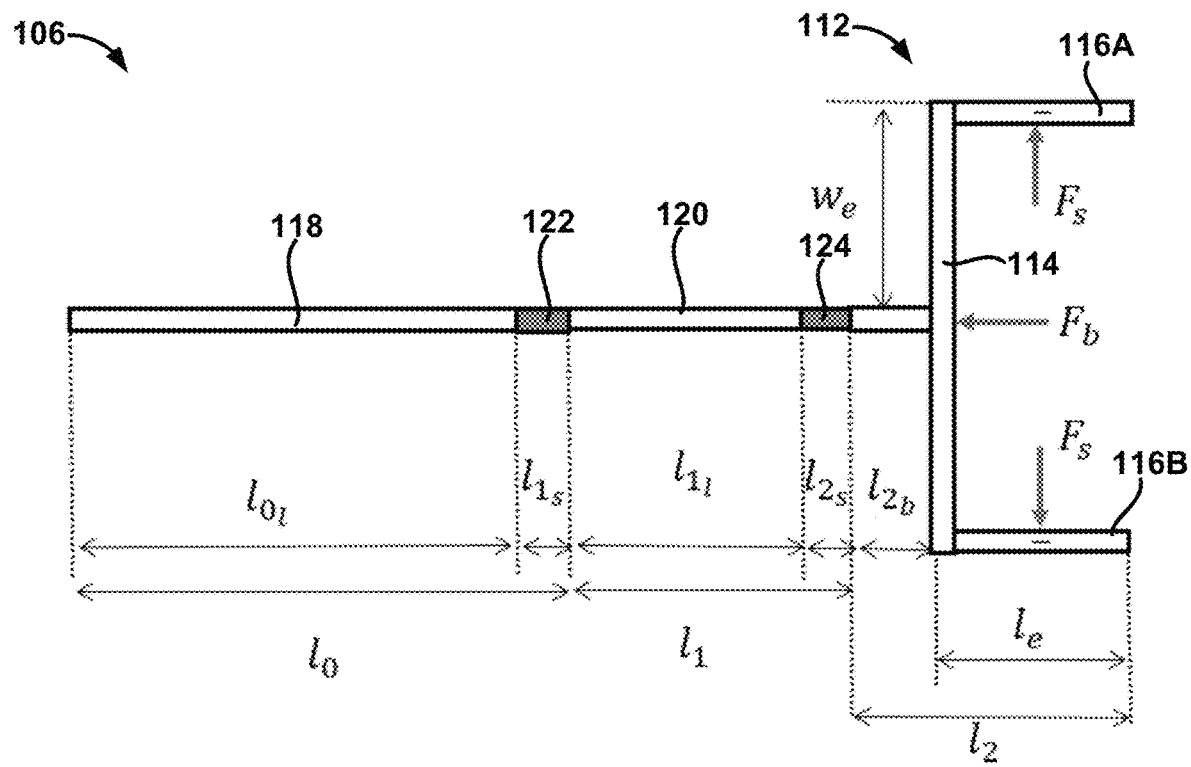
FIG. 5A is a schematic drawing illustrating a top of a robotic arm of the autonomous robotic mobile support system and showing certain geometric parameters for mathematical modeling.
Figure 5B:
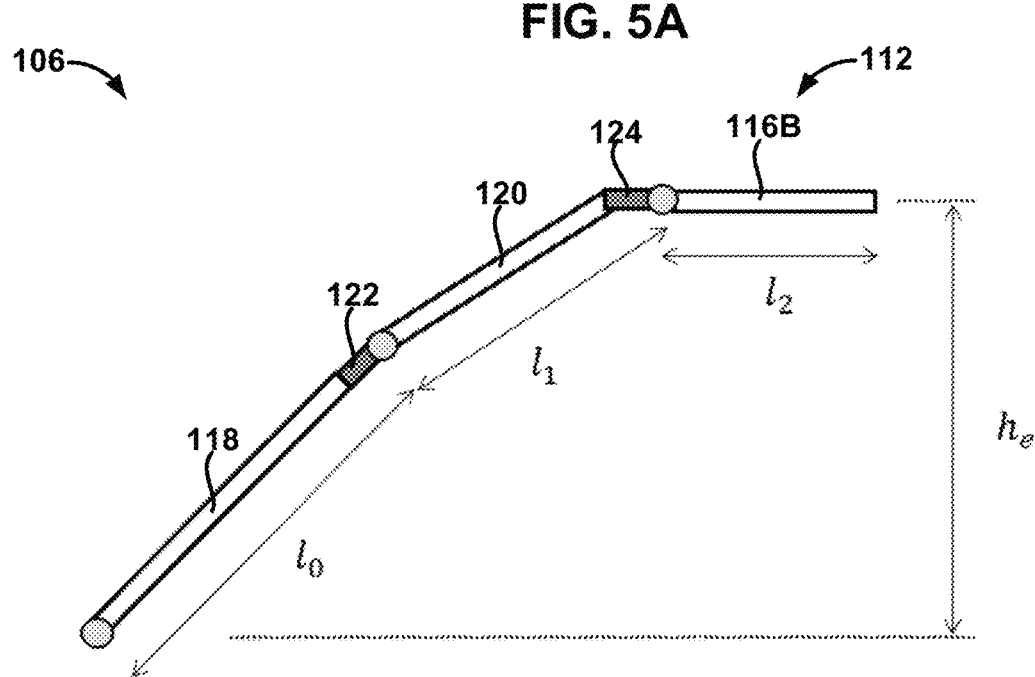
FIG. 5B is a schematic drawing illustrating a side of a robotic arm of the autonomous robotic mobile support system and showing certain geometric parameters for mathematical modeling.

FIGS. 5A and 5B are schematic drawings illustrating a top and side, respectively, of the robotic arm 106. FIGS. 5A and 5B depict certain dimensions of the robotic arm 106 including the lengths of the base arm linkage 118 ("link 0" or $l_0$), the first servomotor 122, the first arm linkage 120 ("link 1" or $l_1$), and the second servomotor 124 and the length and width of components of the second arm linkage or end effector 112 ("link 2" or $l_2$). Table 1 below provides example measurements for one implementation of the robotic arm 106.

For example, the lengths of the base arm linkage 118 and the first arm linkage 120 can be adjusted along with angles $\alpha_o$ and $\alpha_o$ to accommodate a height of the subject.

Mathematical Model

Presented below is a mathematical model for constructing and autonomously operating one implementation of the system 100 disclosed herein.

Geometric and Mass Properties

Tables 1 and 2 below list example geometric and mass parameters for one implementation of the mobile base vehicle 102 and robotic arm 106. In addition, the tables list motion parameters required for mathematical modeling and development of a motion controller for autonomous operation of the system 100.

TABLE 1

List of example parameters in SI units

| Parameter | Definition | Value |
|---|---|---|
| l | Axle to caster distance | 0.330 m |
| h | Wheel to wheel half distance | 0.152 m |
| $l_b$ | Base to axle distance | 0.0 m |
| $R_w$ | Wheel radius | 0.045 m |
| $h_e$ | Range of total desired height of the end-effector | 0.914-1.291 m |
| $d_e$ | Desired distance from caster to the end-effector | 0.406 m |
| $l_{0_l}, l_{0_s}$ | Length of link 0 and servo 1 | 1.000, 0.050 m |
| $l_{1_l}, l_{1_s}$ | Length of link 1 and servo 2 | 0.203, 0.050 m |
| $l_{2_b}$ | Length of link from servo 2 to the end-effector base | 0.000 m |
| $w_e$ | Half of the width of the end-effector | 0.305 m |
| $t_e$ | Additional end-effector tip thickness | 0.025 m |
| $m_{1_s}$ | Mass of servo/gear 1 assembly | 0.180 kg |
| $m_{2_s}$ | Mass of servo/gear 2 | 0.180 kg |
| $\rho$ | Density per unit length of 8020 part 2020 | 0.441 kg/m |
| $m_v$ | Total mass of the base vehicle | 28.0 kg |
| $h_v$ | Height of the base of the arm from ground | 0.100 m |

TABLE 2

List of example parameters in SI units for $h_e$ = 1.067 m

| Parameter | Definition | Value |
|---|---|---|
| d | Overall center of mass (CM) distance to axle | 0.184 m |
| $\alpha_0$ | Link 0 fixed angle from the horizontal | 70.3° |
| $\alpha_1$ | Link 1 angle from the horizontal | −59.1°-32.5° |
| $\theta_{10}$ | Link 1 angle relative to link 0 | −129.4°-27.4° |
| $\theta_{21}$ | Link 2 angle relative to link 1 | −32.5°-59.1° |
| $m_0$ | Total mass of link 0 including servo 1 & other parts | 0.621 kg |
| $m_1$ | Total mass of link 1 including servo 2 & other parts | 0.27 kg |
| $m_2$ | Total mass of link 2 including end-effector & other parts | 0.693 kg |
| m | Total mass of the system | 29.584 kg |
| x | Global x-position of the CM of the whole robot | |
| y | Global y-position of the CM of the whole robot | |
| θ | Orientation of the mobile base vehicle relative to global X-axis | |
| $\theta_1$ | Servo 1 Joint angle | Range: ±45° (will likely be between−10° and 30°) |
| $\theta_2$ | Servo 2 joint angle | Range: ±45° (default at 0° and goes back to 0° after angle changes due to contact with subject) |
| $v_x$ | Forward velocity | |
| $v_y$ | Lateral velocity | |
| ω | Angular velocity | |
| $\omega_R$ | Right wheel angular velocity | |
| $\omega_L$ | Left wheel angular velocity | |
| XYZ & $e_x, e_y$ | Global & body-fixed reference frame | |

Link Lengths and Angles:

$$l_0 = l_{0_l} + l_{1_s}, \quad l_1 = l_{1_l} + l_{2_s} \cos \alpha_2, \quad l_2 = l_{2_b} + l_e$$

Overall Geometry:

$$d_t = l + d_e, \quad d_l = d_t - l_2 - l_{2_s}, \quad h'_e = h_e - h_v$$

$$\theta_1 = -\cos^{-1}\left(\frac{d_l^2 + h_e'^2 - l_0^2 - l_{1_l}^2}{2 l_0 l_{1_l}}\right), \quad \alpha_0 = \phi + \cos^{-1}\left(\frac{A}{\sqrt{h_e'^2 + d_l^2}}\right)$$

$$\alpha_1 = \alpha_0 + \theta_1, \quad A = \frac{d_l^2 + h_e'^2 + l_0^2 - l_{1_l}^2}{2 l_0}, \quad \phi = \tan^{-1}\left(\frac{h_e'}{d_l}\right)$$

Masses:

$$m_0 = m_{0_l} + m_{1_s}, \quad m_1 = m_{1_l} + m_{2_s}, \quad m_2 = m_{2_b} + 2(m_{l_e} + m_{w_e} + m_{t_e}) + m_e$$

Total mass: $m = m_v + m_0 + m_1 + m_2$

Center of Mass (CM) of Each Link:

$$a_0 = \left[\frac{m_{0_l} l_{0_l}}{2} + m_{1_s}\left(l_{0_l} + \frac{l_{1_s}}{2}\right)\right] / m_0$$

$$a_1 = \left[\frac{m_{1_l} l_{1_l}}{2} + m_{2_s}\left(l_{1_l} + \frac{l_{2_s} \cos \alpha_1}{2}\right)\right] / m_1$$

$$a_2 = \frac{\left[\frac{m_{2_b} l_{2_b}}{2} + m_{w_e} l_{2_b} + m_{l_e}\left(l_{2_b} + \frac{l_e}{2}\right) + (m_{t_e} + m_e)(l_{2_b} + l_e)\right]}{m_2}$$

The overall CM is at distance d from the axle:

$$d = [m_v d_v + m_0(l_b + a_0 \cos \alpha_0) + m_1(l_b + l_0 \cos \alpha_0 + a_1 \cos \alpha_1) + m_2(l_b + l_0 \cos \alpha_0 + l_1 \cos \alpha_1 + a_2)] / m$$

Tip-Over Stability Requirements

The risk of the system 100 tipping over when subjected to back forces $F_b$ or side forces $F_s$ from the subject are mitigated by several design features. The various forces are illustrated in FIG. 5. The tip-over depends on the magnitude of these forces, the height of the robotic arm $h_e$, overall CM distance from the axle d and wheel to wheel half distance h. The stability conditions are as follows:

$$F_s \cdot h_e \leq mg \cdot h \rightarrow mg \geq F_s \cdot h_e/h \text{ for lateral stability}$$

$$F_b \cdot h_e \leq mg \cdot d \rightarrow mg \geq F_b \cdot h_e/d \text{ for longitudinal stability}$$

Considering practical values of h=d=0.2 m and a height of $h_e$=1 m (relatively tall person), the system 100 must weigh 5 times more than $F_b$ or $F_s$. The magnitude of F does factor in a subject's weight. For example, for a 10-lb lateral or longitudinal force, the system 100 must weigh about 50 lbs. Since the system is designed to prevent the subject from falling before going unstable, we do not expect any force to exceed 10 lbs. and the system will be designed to handle those force levels.

A minimum weight of the mobile base vehicle 102 can be determined by a height of the subject (H), a weight of the subject (WP), and the equation:

Minimum Weight of Mobile Base Vehicle
$(WR) = H^* WP^* \sin \beta/(2h)$ where $\beta$ is a tilt angle of the subject as measured from an upright position (where $0 \leq \beta \leq 5°$), and h is one-half of a distance separating the two differentially driven wheels. For example, if a width of the mobile base vehicle 102 is 24-inch, h=12 in =0.305 m. The minimum weight of the mobile base vehicle 102 can be calculated using a 5-degree angle to provide a level of cushion relative to a 2-degree threshold.

Planned Scenario, $\beta \leq 5°$:
For a tall 200-lb 6 ft 2 in. subject, a full 5° from upright: WR=24.4 kg=53.7 lbs
For a tall 160-lb 5 ft 9 in. subject, a full 5° from upright: WR=18.2 kg=40.1 lbs Control System Below is a description of control system software and hardware that allows the system 100 to operate autonomously. The LIDAR sensor 108 can undertake distance measurements between the LIDAR sensor 108 and defined points 700 along the dorsum region of the subject (see, e.g., FIGS. 7A and 8). The LIDAR sensor 108 can transmit such measurements to the onboard computing device 110 (e.g., an onboard Rasberry Pi® computer) and the onboard computing device 110 can process such data and determine a speed and direction of the mobile base vehicle 102. The onboard computing device 110 can then transmit commands to a microcontroller (e.g., an Arduino® board) electrically coupled or in electrical communication to the onboard computing device 110. Software can be written on the microcontroller to control the DC motors powering the differentially driven wheel 104 based on commands from the onboard computing device 110. The microcontroller can also maintain the angles ($\theta_1$, $\theta_2$) of the robotic arm 106 through the two servomotors.

The system 100 can be configured to follow a continuous, albeit variable trajectory. The trajectory can be defined by the subject, as the system 100 follows the subject from a safe distance behind the subject, responding to variations in cadence, direction, velocity and angular movements. The software can use distance measurements from the LIDAR sensor 108 (i.e., distance measurements to multiple defined points 700 across the back and/or waist/hips of the subject, see FIG. 7A) to ensure the system 100 follows the subject with the robotic arm ready to help stabilize the subject if the subject begins to fall backwards and/or to the side.

Below are several examples of the system in operation:
1) When the subject is walking forward or in a substantially straight-line trajectory, the system 100 can sense the changing distance and adjust the speed of the mobile base vehicle 102 in response to variations in the subject's velocity of gait.
2) If the subject turns left or right, the system 100 can sense a change in the distances separating the LIDAR sensor 108 (and, by extension, the system 100) from the defined points 700 (see, e.g., FIG. 7A) on the back and/or waist/hips of the subject and the system 100 can use such distance measurements to calculate wheel rotational speeds that would allow the mobile base vehicle 102 to also turn left or right.
3) If the subject falls backward, the system 100 can sense a change in the distance separating the LIDAR sensor 108 from the subject and the system 100 can instruct the mobile base vehicle 102 increase a speed of the mobile base vehicle 102 and use the padded back support 114 (or a combination of the padded back support 114 and at least one of the padded side supports 116) of the end effector 112 to push the subject back to a straight or upright position. 4) If the subject starts falling laterally, the subject will push or apply a force to at least one of the side supports 116 and angle $\theta_2$ (see FIG. 4) will become non-zero. Once this angle has reached or exceeds a preset threshold rotation value ((±2 degrees), the system 100 can use the second servomotor 124 to straighten the end effector 112 and push the subject back to a straightened or upright position.

Figure 6A:
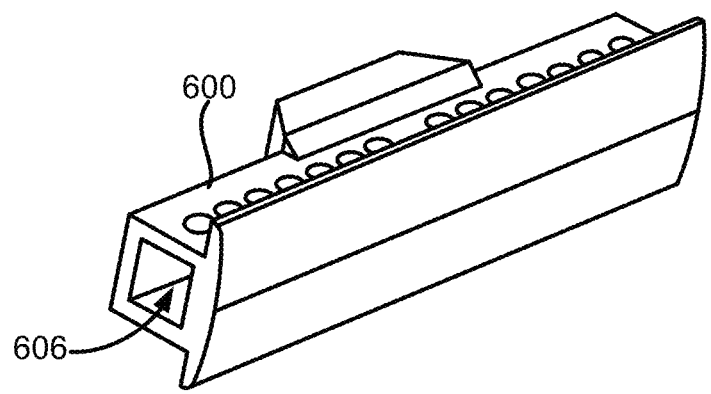
FIG. 6A illustrates a perspective view of a component used to construct a back support of an end effector of the robotic arm.
Figure 6B:
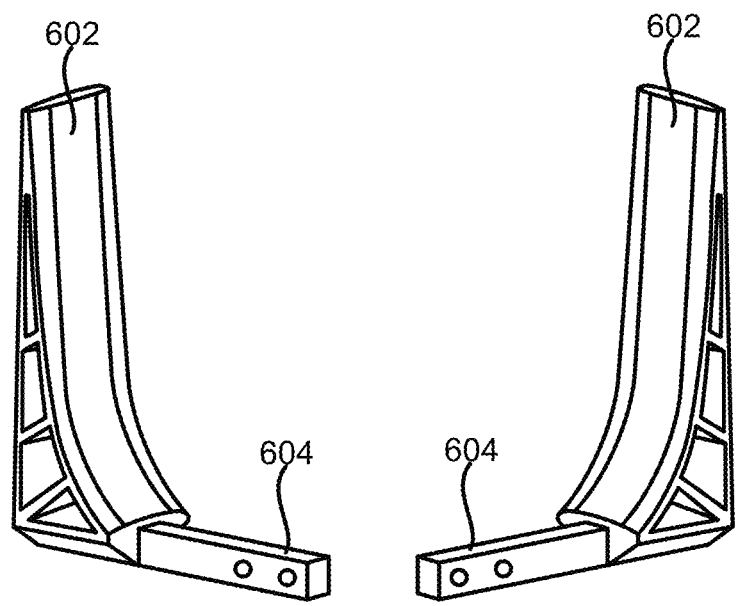
FIG. 6B illustrates a perspective view of components used to construct side supports of the end effector of the robotic arm.

FIG. 6A illustrates a perspective view of a back support component 600 used to construct the back support 114 of the end effector 112 of the robotic arm 106. FIG. 6B illustrates a perspective view of side support components 602 used to construct the side supports 116 of the end effector 112 of the robotic arm 106.

The back support component 600 and the side support components 602 can be made in part of a rigid material such as a rigid metallic material. For example, the back support component 600 and the side support components 602 can be made in part of aluminum or aluminum alloy, stainless steel, titanium, or a combination thereof.

As shown in FIGS. 6A and 6B, each of the side support components 602 can comprise a narrowed connector portion 604. The narrowed connector portions 604 can be configured to fit or extend (at least partially) into a connecting cavity 606 of the back support component 600. Once the narrowed connector portions 604 are extended or slid into the connecting cavity 606, the side support components 602 can be coupled to the back support component 600 using nuts and bolts, screws, or a combination thereof. A distance or width separating the two side support components 602 can be adjusted to accommodate a girth of the subject.

The back support component 600 and the side support components 602 can be covered (at least partially) by a soft padding or cushioning material. The back support component 600 and the side support components 602 can also serve as a frame for one or more padded coverings or padded portions. The padded back support 114 and side supports 116 can be the only parts of the system 100 that come into physical contact with the subject to support the subject and/or prevent the subject from falling.

As discussed above, the system 100 can follow the subject from a safe distance behind the subject and adjust the speed of the mobile base vehicle 102 in response to a speed of the subject. For example, the one or more processors of the onboard computing device 110 can be programmed to execute further instructions to determine a forward velocity ($v_x$) of the mobile base vehicle 102 using the equation:

$$v_x = k1 * (xlmin - dist)$$

where xlmin is a minimum distance from the set of distance measurements made by the LIDAR sensor 108 (e.g., distance measurements between the LIDAR sensor 108 and the defined points 700 along the dorsum region of the subject), dist is a predefined desired distance, and k1 is a first proportional control gain. The proportional control gain can be a ratio of an output response to an error signal.

The forward velocity can be augmented by an angular speed to ensure the mobile base vehicle 102 can turn either left or right in response to a left or right turn of the subject.

For example, the one or more processors of the onboard computing device 110 can be programmed to execute further instructions to determine an angular velocity ($\omega$) of the mobile base vehicle 102 using the equation:

$$\omega = k2 * \frac{\phi_2 + \phi_3}{2}$$

where k2 is a second proportional control gain, and $\phi_2$ and $\phi_3$ are angles of rotation of the subject determined by the equations:

$$\phi_2 = atan \frac{\begin{bmatrix} xl(\text{first selected defined point}) - \\ xl(\text{second selected defined point}) \end{bmatrix}}{\begin{bmatrix} yl(\text{first selected defined point}) - \\ yl(\text{second selected defined point}) \end{bmatrix}}$$

$$\phi_3 = atan \frac{\begin{bmatrix} xl(\text{third selected defined point}) - \\ xl(\text{fourth selected defined point}) \end{bmatrix}}{\begin{bmatrix} yl(\text{third selected defined point}) - \\ yl(\text{fourth selected defined point}) \end{bmatrix}}$$

where yl and xl represent the (y, x) position of the defined points 700 (see FIG. 7A) across the dorsum of the subject as measured by the LIDAR sensor 108.

Figure 7A:
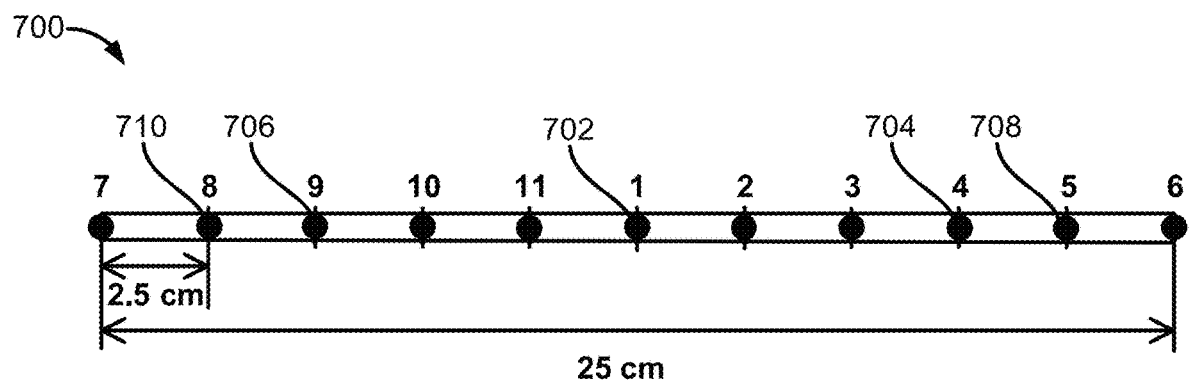
FIG. 7A illustrates example defined points along a dorsum region of a subject used by a LIDAR sensor of the autonomous robotic mobile support system to undertake distance measurements to the subject.

FIG. 7A illustrates example defined points 700 that can be used by the LIDAR sensor 108 to undertake distance measurements to the subject. In some instances, the defined points 700 can be a horizontally aligned set of points along a back of the subject. In other instances, the defined points 700 can be defined along a waist, lumbar region, and/or hips of the user. In instances where the system 100 comprises a leg LIDR sensor 126, the defined points 700 can be defined along the legs (e.g., along the hamstrings or calves) of the subject.

A shown in FIG. 7A, an origin point 702 can be located in line or aligned with a center of the LIDAR sensor 108, x(i) represents a distance to a selected defined point in the x-direction where the positive x-axis is directly in front of the LIDAR sensor 108, and y(i) represents a distance to the selected defined point in the y-direction where the positive y-axis is toward a right-hand side of the subject.

It has been discovered by the applicant that certain defined points 700 can be selected that can yield more accurate angle calculations for the equations above. For example, the first selected defined point 704 can be point 4 in FIG. 7A, the second selected defined point 706 can be point 9 in FIG. 7A, the third selected defined point 708 can be point 5 in FIG. 7A, and the fourth selected defined point 710 can be point 8 in FIG. 7A.

Figure 7B:
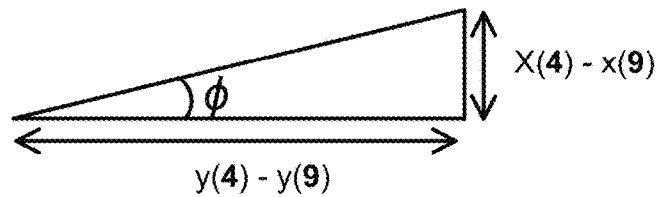
FIG. 7B illustrates an example angle used to determine the subject's direction of motion.

Thus, the angle in each case ($\phi_2$, $\phi_3$) can be determined using a basic right-angle triangle as shown in FIG. 7B:

$$\begin{cases} \phi_2 = atan \frac{[xl(4) - xl(9)]}{[yl(4) - yl(9)]} \\ \phi_3 = atan \frac{[xl(5) - xl(8)]}{[yl(5) - yl(8)]} \end{cases}$$

Although 11 points are shown in FIG. 7A, it is contemplated by this disclosure and it should be understood by one of ordinary skill in the art that the defined points 700 can range from 8 points up to 20 points. In other implementations, the defined points 700 can range from 20 points to 30 points or greater.

As previously discussed, the system 100 can comprise two differentially driven wheels 104 where each wheel is independently driven by a DC motor. The one or more processors of the onboard computing device 110 can also be programmed to execute further instructions to determine a right wheel angular velocity ($\omega_R$) and a left wheel angular velocity ($\omega_L$) using the kinematic equations:

$$\omega_R = \frac{v_x + h\omega}{R_w}$$

$$\omega_L = \frac{v_x - h\omega}{R_w}$$

where $\omega$ is the angular velocity, where h is one-half of a distance separating the two differentially driven wheels, and $R_w$ is a radius of at least one of the differentially driven wheels.

The right wheel angular velocity ($\omega_R$) and the left wheel angular velocity ($\omega_L$) can then be used to calculate desired wheel speeds in revolutions per minute (RPM).

For example, the one or more processors can be programmed to execute further instructions to determine a left wheel RPM ($RPM_{L\_Des}$) and a right wheel RPM ($RPM_{R\_Des}$) using the following equations:

$$RPM_{L\_Des} = \frac{\omega_L * 30}{\pi}$$

$$RPM_{R\_Des} = \frac{\omega_R * 30}{\pi}$$

where $\omega_R$ is the right wheel angular velocity and $\omega_L$ is the left wheel angular velocity.

When a subject begins to fall backwards, the wheel RPMs (the left wheel and right wheel RMPs) can be set to 25 RPM in order to provide a stabilizing push. This value can be adjusted to provide better support for subjects depending on the weight of the subject.

Once the wheel RMPs are calculated, these values are sent from the onboard computing device (e.g., the onboard Raspberry Pi® computer) to the microcontroller (e.g., the Arduino® control board) which uses a proportional integral controller to maintain the desired wheel speeds. Each motor is equipped with a rotary encoder which determines the actual wheel RPM ($RPM_L$, $RPM_L$) as follows:

$$\begin{cases} DCounter_L = Counter_L - lastCounter_L \\ DCounter_R = Counter_R - lastCounter_R \end{cases}$$

$$\begin{cases} RPM_L = \dfrac{DCounter_L * 5}{4} \\ RPM_R = \dfrac{DCounter_R * 5}{4} \end{cases}$$

where DCounter is the change in encoder count, Counter is the current encoder position, and lastCounter is the previous counter position. The error is determined by taking the difference between the actual and desired wheel RPMs as follows:

$$\begin{cases} Error_L = RPM_{L\_Des} - RPM_L \\ Error_R = RPM_{R\_Des} - RPM_R \end{cases}$$

The sum of the error Error_sum is given as:

$$\begin{cases} \text{Error\_sum}_L = Error_L + lastError_L \\ \text{Error\_sum}_R = Error_R + lastError_R \end{cases}$$

where lastError is the error sum from the previous step. The controller is then defined as:

$$\begin{cases} PWM_L = k_{pL} * Error_L + k_{iL} * \text{Error\_sum}_L \\ PWM_R = k_{pR} * Error_R + k_{iR} * \text{Error\_sum}_R \end{cases}$$

where ($k_{pL}$, $k_{iL}$) and ($k_{pR}$, $k_{jR}$) are the left and right wheel proportional and integral gains, respectively, and $PWM_L$, $PWM_R$ are the pulse-width modulation scales that determine the DC motor speeds.

Figure 8:
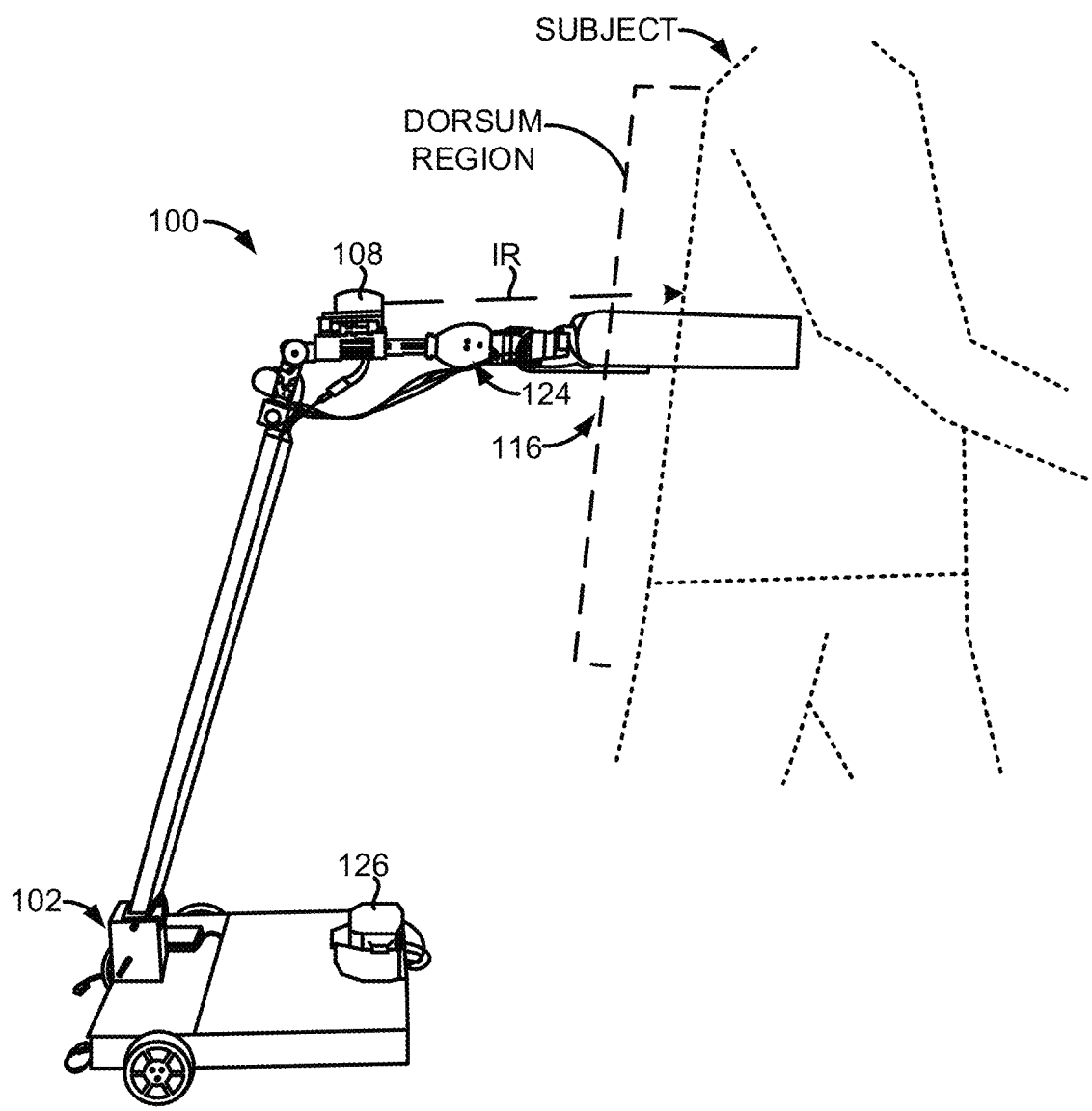
FIG. 8 illustrates the robotic mobile support system autonomously following a subject from a posterior direction and configured to support the subject in the event of a fall.

FIG. 8 illustrates that the robotic mobile support system 100 can autonomously follow a subject from a posterior direction and the robotic arm 106 can support the subject in the event of a fall. The system 100 can autonomously follow the subject without the subject having to physically contact (e.g., hold on to) any part of the system 100 or use a joystick or other type of controller. The system 100 can react to movements of the subject (e.g., movements indicating that a fall may occur) and provide support for the subject via the robotic arm 106 without the subject having to command or alert the system 100.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example 1.5, 2.5, etc. and any whole or partial increments therebetween.

All existing subject matter mentioned herein (e.g., publications, patents, patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Unless defined otherwise, all technical and scientific terms used herein have the same meaning as commonly understood by one of ordinary skill in the art to which this invention belongs.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" "element," or "component" when used in the singular can have the dual meaning of a single part or a plurality of parts. As used herein, the following directional terms "forward, rearward, above, downward, vertical, horizontal, below, transverse, laterally, and vertically" as well as any other similar directional terms refer to those positions of a device or piece of equipment or those directions of the device or piece of equipment being translated or moved. Finally, terms of degree such as "substantially", "about" and "approximately" as used herein mean a reasonable amount of deviation (e.g., a deviation of up to ±0.1%, ±1%, ±5%, or ±10%, as such variations are appropriate) from the specified value such that the end result is not significantly or materially changed.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

We claim:
1. A robotic mobile support system, comprising:
a mobile base vehicle comprising two differentially driven wheels;
a robotic arm coupled to the mobile base vehicle and extending from the mobile base vehicle in a direction of a subject, wherein the robotic arm comprises an end effector configured to support the subject in the event of a fall;
a LIDAR sensor coupled to the robotic arm, wherein the LIDAR sensor is configured to undertake distance measurements between the LIDAR sensor and defined points along a dorsum region or a posterior truncal region of the subject; and
an onboard computing device comprising one or more processors and memory units, wherein the one or more processors are programmed to execute instructions stored in the one or more memory units to use the distance measurements from the LIDAR sensor to generate commands to adjust at least one of a speed and direction of the mobile base vehicle in response to a movement of the subject to allow the robotic mobile support system to autonomously follow the subject from a posterior direction and support the subject in the event of a fall.

2. The system of claim 1, wherein the one or more processors are programmed to execute further instructions to determine a forward velocity ($v_x$) of the mobile base vehicle using the equation:

$$v_x = k1*(xl\text{min}-\text{dist})$$

wherein xlmin is a minimum distance from a set of distance measurements made by the LIDAR sensor, dist is a predefined desired distance, and k1 is a first proportional control gain.

3. The system of claim 2, wherein the one or more processors are programmed to execute further instructions to determine an angular velocity ($\omega$) of the mobile base vehicle using the equation:

$$\omega = k2 * \frac{\phi_2 + \phi_3}{2}$$

wherein k2 is a second proportional control gain, and $\phi_2$ and $\phi_3$ are angles of rotation of the subject determined by the equations:

$$\phi_2 = a\tan\frac{\begin{bmatrix} xl(\text{first selected defined point}) - \\ xl(\text{second selected defined point}) \end{bmatrix}}{\begin{bmatrix} yl(\text{first selected defined point}) - \\ yl(\text{second selected defined point}) \end{bmatrix}}$$

$$\phi_3 = a\tan\frac{\begin{bmatrix} xl(\text{third selected defined point}) - \\ xl(\text{fourth selected defined point}) \end{bmatrix}}{\begin{bmatrix} yl(\text{third selected defined point}) - \\ yl(\text{fourth selected defined point}) \end{bmatrix}}$$

wherein yl and xl represent the (y, x) position of the defined points across the dorsum region or the posterior truncal region of the subject as measured by the LIDAR sensor, wherein an origin is located at a center of the LIDAR sensor, wherein x(i) represents a distance to a selected defined point in the x-direction where the positive x-axis is directly in front of the LIDAR sensor, and wherein y(i) represents a distance to the selected defined point in the y-direction where the positive y-axis is toward a right-hand side of the subject.

4. The system of claim 3, wherein the one or more processors are programmed to execute further instructions to determine a right wheel angular velocity ($\omega_R$) of a right wheel of the two differentially driven wheels and determine a left wheel angular velocity ($\omega_L$) of a left wheel of the two differentially driven wheels, using the equations:

$$\omega_R = \frac{v_x + h\omega}{R_w}$$

$$\omega_L = \frac{v_x - h\omega}{R_w}$$

wherein $\omega$ is the angular velocity, wherein h is one-half of a distance separating the two differentially driven wheels, and $R_w$ is a radius of at least one of the differentially driven wheels.

5. The system of claim 4, wherein the one or more processors are programmed to execute further instructions to determine a left wheel revolutions per minute ($RPM_{L\_Des}$) of the left wheel of the two differentially driven wheels and a right wheel revolutions per minute ($RPM_{R\_Des}$) of the right wheel of the two differentially driven wheels using the following equations:

$$RPM_{L\_Des} = \frac{\omega_L * 30}{\pi}$$

$$RPM_{R\_Des} = \frac{\omega_R * 30}{\pi}$$

wherein $\omega_R$ is the right wheel angular velocity and $\omega_L$ is the left wheel angular velocity.

6. The system of claim 1, wherein a minimum weight of the mobile base vehicle is determined by a height of the subject (H), a weight of the subject (WP), and the equation:

Minimum Weight of Mobile Base Vehicle=$H*WP*\sin \beta/(2h)$ wherein $\beta$ is a tilt angle of the subject as measured from an upright position, and h is one-half of a distance separating the two differentially driven wheels.

7. The system of claim 1, further comprising a leg LIDAR sensor positioned on the mobile base vehicle and configured to undertake distance measurements between the leg LIDAR sensor and defined points along a leg region of the subject.

8. The system of claim 1, wherein the onboard computing device further comprises a wireless communication module configured to receive commands from a radio frequency (RF) transmitter, and wherein movement of the mobile base vehicle is halted in response to an emergency stop command received from the RF transmitter via the wireless communication module.

9. The system of claim 1, wherein the LIDAR sensor is a 2D LIDAR sensor configured to emit a modulated infrared laser light at the dorsum region or the posterior truncal region of the subject.

10. The system of claim 9, wherein the infrared laser light can have a wavelength of between about 775 nm and 795 nm.

11. The system of claim 9, wherein the LIDAR sensor has a scanning range of up to 8 meters.

12. A method of supporting a subject, the method comprising:
measuring, using a LIDAR sensor, distances between the LIDAR sensor and defined points along a dorsum region or a posterior truncal region of the subject, wherein the LIDAR sensor is coupled to a robotic arm extending from a mobile base vehicle in a direction of the subject,
and wherein the mobile base vehicle, the LIDAR sensor, and the robotic arm are part of a robotic mobile support system,
wherein the robotic arm comprises an end effector configured to support the subject in the event of a fall; and
generating commands to adjust at least one of a speed and direction of the mobile base vehicle, using one or more processors of an onboard computing device of the robotic mobile support system, based on the distance measurements made by the LIDAR sensor in response to a movement of the subject to allow the robotic mobile support system to autonomously follow the subject from a posterior direction and support the subject in the event of a fall.

13. The method of claim 12, further comprising determining, using the one or more processors, a forward velocity ($v_x$) of the mobile base vehicle using the equation:

$$v_x = k1 * (xlmin - dist)$$

wherein xlmin is a minimum distance from a set of distance measurements made by the LIDAR sensor, dist is a predefined desired distance, and k1 is a first proportional control gain.

14. The method of claim 13, further comprising determining, using the one or more processors, an angular velocity ($\omega$) of the mobile base vehicle using the equation:

$$\omega = k2 * \frac{\phi_2 + \phi_3}{2}$$

wherein k2 is a second proportional control gain, and $\phi_2$ and $\phi_3$ are angles of rotation of the subject determined by the equations:

$$\phi_2 = atan \frac{\begin{bmatrix} xl(\text{first selected defined point}) - \\ xl(\text{second selected defined point}) \end{bmatrix}}{\begin{bmatrix} yl(\text{first selected defined point}) - \\ yl(\text{second selected defined point}) \end{bmatrix}}$$

$$\phi_3 = atan \frac{\begin{bmatrix} xl(\text{third selected defined point}) - \\ xl(\text{fourth selected defined point}) \end{bmatrix}}{\begin{bmatrix} yl(\text{third selected defined point}) - \\ yl(\text{fourth selected defined point}) \end{bmatrix}}$$

wherein yl and xl represent the (y, x) position of the defined points across the dorsum region or the posterior truncal region of the subject as measured by the LIDAR sensor, wherein an origin is located at a center of the LIDAR sensor, wherein x(i) represents a distance to a selected defined point in the x-direction where the positive x-axis is directly in front of the LIDAR sensor, and wherein y(i) represents a distance to the selected defined point in the y-direction where the positive y-axis is toward a right-hand side of the subject.

15. The method of claim 14, further comprising determining, using the one or more processors, a right wheel angular velocity ($\omega_R$) of a right wheel of the two differentially driven wheels and a left wheel angular velocity ($\omega_L$) of a left wheel of the two differentially driven wheels, using the equations:

$$\omega_R = \frac{v_x + h\omega}{R_w}$$

$$\omega_L = \frac{v_x - h\omega}{R_w}$$

wherein $\omega$ is the angular velocity, wherein h is one-half of a distance separating the two differentially driven wheels, and $R_w$ is a radius of at least one of the differentially driven wheels.

16. The method of claim 15, further comprising determining, using the one or more processors, a left wheel revolutions per minute ($RPM_{L\_Des}$) of the left wheel of the two differentially driven wheels and a right wheel revolutions per minute ($RPM_{R\_Des}$) of the right wheel of the two differentially driven wheels using the following equations:

$$RPM_{L\_Des} = \frac{\omega_L * 30}{\pi}$$

$$RPM_{R\_Des} = \frac{\omega_R * 30}{\pi}$$

wherein $\omega_R$ is the right wheel angular velocity and $\omega_L$ is the left wheel angular velocity.

17. The method of claim 12, further comprising determining a minimum weight of the mobile base vehicle using the equation:

Minimum Weight of Mobile Base Vehicle=$H*WP*\sin \beta/(2h)$ wherein H is a height of the subject, WP is a weight of the subject, $\beta$ is a tilt angle of the subject as measured from an upright position, and h is one-half of a distance separating the two differentially driven wheels.

18. The method of claim 12, further comprising measuring, using a leg LIDAR sensor positioned on the mobile base vehicle, distances between the leg LIDAR sensor and defined points along a leg region of the subject.

19. The method of claim 12, further comprising:
receiving an emergency stop command from a radio frequency transmitter via a wireless communication module of the onboard computing device,
wherein power to the plurality of direct current (DC) motors is shut off in response to the emergency stop command.

20. The method of claim 12, wherein the LIDAR sensor is a 2D LIDAR sensor configured to emit a modulated infrared laser light at the dorsum region or the posterior truncal region of the subject.

21. The method of claim 20, wherein the infrared laser light can have a wavelength of between about 775 nm and 795 nm.

22. The method of claim 20, wherein the LIDAR sensor has a scanning range of up to 8 meters.

23. A robotic mobile support system, comprising:
a mobile base vehicle comprising two differentially driven wheels;

a robotic arm coupled to the mobile base vehicle and extending from the mobile base vehicle in a direction of a subject, wherein the robotic arm comprises an end effector comprising a padded back support and padded adjustable side supports,
- wherein the padded back support is configured to support the subject in the event of a backward fall, and
- wherein the padded adjustable side supports are configured to support the subject in the event of a lateral fall;

a plurality of geared servomotors configured to operate the robotic arm including the end effector;

a LIDAR sensor coupled to the robotic arm, wherein the LIDAR sensor is configured to undertake distance measurements between the LIDAR sensor and defined points along a dorsum region or a posterior truncal region of the subject; and an onboard computing device comprising one or more processors and memory units, wherein the one or more processors are programmed to execute instructions stored in the memory units to use the distance measurements from the LIDAR sensor to generate commands to adjust at least one of a speed and direction of the mobile base vehicle in response to a movement of the subject to allow the robotic mobile support system to autonomously follow the subject from a posterior direction and support the subject in the event of a fall.

24. The system of claim 23, wherein the one or more processors are programmed to execute further instructions to generate a command to rotate the end effector with respect to a horizontal orientation plane using one of the plurality of geared servomotors in response to an initial rotation of the end effector caused by a lateral fall of the subject, wherein the initial rotation is beyond a preset threshold rotation value.

25. The system of claim 23, wherein a length of the robotic arm is adjustable to adapt to a height of the subject, and wherein a width separating the padded adjustable side supports is adjustable to adapt to a girth of the subject.

26. The system of claim 23, wherein the onboard computing device further comprises a wireless communication module configured to receive commands from a radio frequency (RF) transmitter, and wherein movement of the mobile base vehicle is halted in response to an emergency stop command received from the RF transmitter via the wireless communication module.

27. The system of claim 23, wherein the LIDAR sensor is a 2D LIDAR sensor configured to emit a modulated infrared laser light at the dorsum region or the posterior truncal region of the subject.

28. The system of claim 27, wherein the infrared laser light can have a wavelength of between about 775 nm and 795 nm.

29. The system of claim 27, wherein the LIDAR sensor has a scanning range of up to 8 meters.

* * * * *